(12) United States Patent
Matsusue

(10) Patent No.: US 10,090,544 B2
(45) Date of Patent: Oct. 2, 2018

(54) FUEL CELL SYSTEM AND CONTROL METHOD FOR FUEL CELL SYSTEM

(75) Inventor: Masaaki Matsusue, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 289 days.

(21) Appl. No.: 13/817,794

(22) PCT Filed: Jul. 27, 2011

(86) PCT No.: PCT/IB2011/001734
§ 371 (c)(1),
(2), (4) Date: Feb. 19, 2013

(87) PCT Pub. No.: WO2012/023011
PCT Pub. Date: Feb. 23, 2012

(65) Prior Publication Data
US 2013/0157161 A1 Jun. 20, 2013

(30) Foreign Application Priority Data
Aug. 20, 2010 (JP) ................................ 2010-184749

(51) Int. Cl.
*H01M 8/0432* (2016.01)
*H01M 8/04291* (2016.01)
(Continued)

(52) U.S. Cl.
CPC ... *H01M 8/04365* (2013.01); *H01M 8/04291* (2013.01); *H01M 8/04753* (2013.01);
(Continued)

(58) Field of Classification Search
CPC ........... H01M 8/04089; H01M 8/0432; H01M 8/04328; H01M 8/04335; H01M 8/04343; H01M 8/0434; H01M 8/04365; H01M 8/045; H01M 8/04507; H01M 8/04514; H01M 8/04522; H01M 8/04611; H01M 8/04619; H01M 8/04708; H01M 8/04716;
(Continued)

(56) References Cited

U.S. PATENT DOCUMENTS 5,677,073 A * 10/1997 Kawatsu ........... H01M 8/04223
204/265
6,682,839 B2 * 1/2004 Wilkinson et al. ........... 429/410
(Continued)

FOREIGN PATENT DOCUMENTS

DE 19930876 A1 1/2001
DE 112008001769 T5 5/2010
(Continued)

*Primary Examiner* — Ula Corinna Ruddock
*Assistant Examiner* — Thomas H Parsons
(74) *Attorney, Agent, or Firm* — Hunton Andrews Kurth LLP

(57) ABSTRACT

A fuel cell system includes: a fuel cell stack; a fuel gas supply/exhaust unit; an oxidant gas supply/exhaust unit; and a control unit. The control unit determines whether there is a phenomenon in the fuel cell stack resulting from local power generation concentration within a plane of a membrane electrode assembly due to a water distribution. When it is determined that there is the phenomenon, the control unit controls at least one of the fuel gas supply/exhaust unit and the oxidant gas supply/exhaust unit.

7 Claims, 14 Drawing Sheets

(51) Int. Cl.
H01M 8/04746 (2016.01)
H01M 8/04828 (2016.01)
H01M 8/04492 (2016.01)
H01M 8/04992 (2016.01)

(52) U.S. Cl.
CPC ........ *H01M 8/04828* (2013.01); *H01M 8/045* (2013.01); *H01M 8/0435* (2013.01); *H01M 8/04335* (2013.01); *H01M 8/04507* (2013.01); *H01M 8/04529* (2013.01); *H01M 8/04761* (2013.01); *H01M 8/04992* (2013.01)

(58) Field of Classification Search
CPC ......... H01M 8/04731; H01M 8/04835; H01M 8/04843
See application file for complete search history.

(56) References Cited

U.S. PATENT DOCUMENTS 8,524,403 B2 * 9/2013 Toida et al. ............... 429/413

| | | |
|---|---|---|
| 2002/0164510 A1 | 11/2002 | Brueck et al. |
| 2004/0091758 A1 | 5/2004 | Kuriyama et al. |
| 2005/0053814 A1 | 3/2005 | Imamura et al. |
| 2008/0311451 A1* | 12/2008 | Araki ............... H01M 8/04104 429/465 |
| 2011/0008699 A1 | 1/2011 | Hashimoto et al. |
| 2011/0274992 A1 | 11/2011 | Toida et al. |

FOREIGN PATENT DOCUMENTS

| | | |
|---|---|---|
| EP | 2 383 826 A1 | 11/2011 |
| JP | 2007-317553 A | 12/2001 |
| JP | 2005-191997 A | 7/2005 |
| JP | 2006-59748 A | 3/2006 |
| JP | 2008-041625 A | 2/2008 |
| JP | 2009-004151 A | 1/2009 |
| JP | 2009-009891 A | 1/2009 |
| JP | 2009-181794 A | 8/2009 |
| JP | 2009-289461 A | 12/2009 |
| WO | 2010073380 A1 | 7/2010 |

* cited by examiner

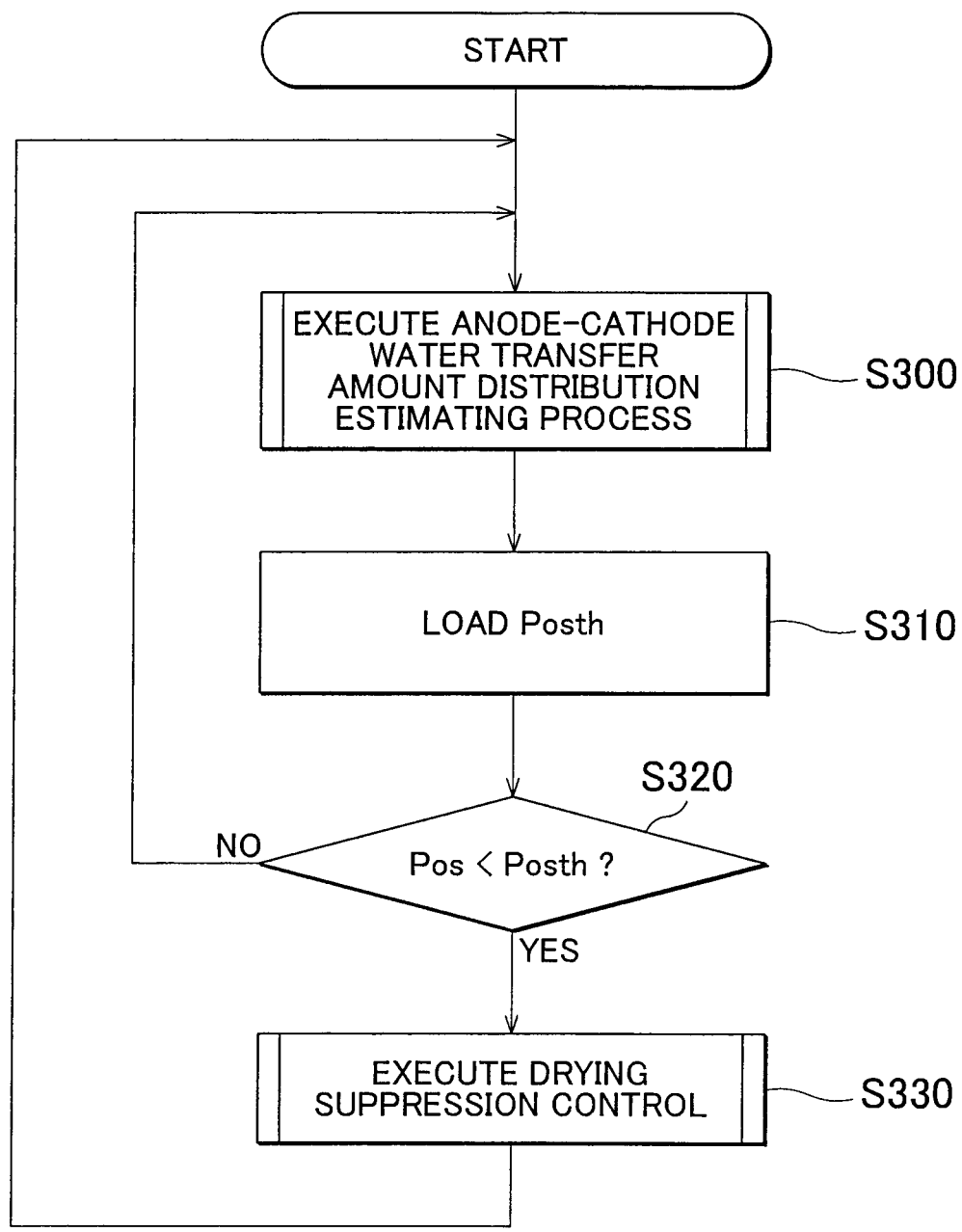

F I G . 18
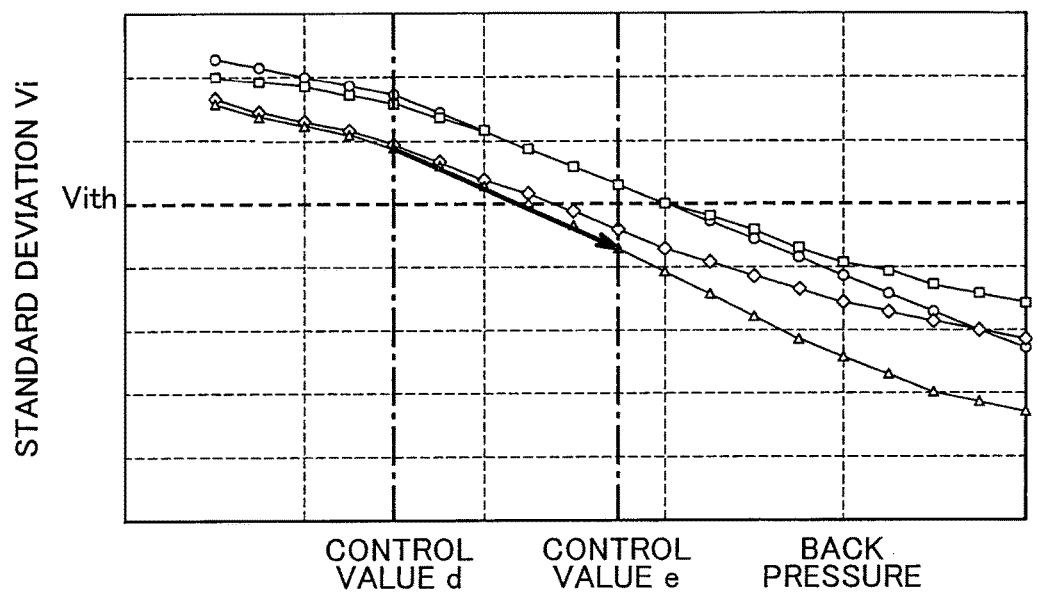

FUEL CELL SYSTEM AND CONTROL METHOD FOR FUEL CELL SYSTEM

CROSS-REFERENCE TO RELATED APPLICATIONS

This application is a United States National Stage Patent Application filed under 35 U.S.C. § 371, based on International Application Serial No. PCT/IB2011/001734, which was filed on Jul. 27, 2011, which claims priority to Japanese Patent Application No. 2010-184749, filed on Aug. 20, 2010, the entire contents of each of which are expressly incorporated herein by reference.

BACKGROUND OF THE INVENTION

1. Field of the Invention

The invention relates to a fuel cell system and a control method for a fuel cell system.

2. Description of Related Art

A fuel cell that generates electric power by the electrochemical reaction between fuel gas and oxidant gas attracts attention as an energy source. The fuel cell includes a polymer electrolyte fuel cell that uses a polymer electrolyte membrane as an electrolyte membrane. The polymer electrolyte fuel cell generally uses a membrane electrode assembly in which an anode and a cathode are respectively bonded to both surfaces of the electrolyte membrane. Then, in the polymer electrolyte fuel cell, in order to obtain desired power generation performance, it is necessary to keep the electrolyte membrane in an appropriate wet state to thereby appropriately maintain the proton conductivity of the electrolyte membrane.

In such a polymer electrolyte fuel cell, during power generation, there occurs a nonuniform water content distribution (nonuniform distribution of wet state) within the plane of the electrolyte membrane of the membrane electrode assembly, and the nonuniform water content distribution may cause a nonuniform power generation distribution. Then, when there occurs a locally insufficient water content within the plane of the electrolyte membrane, the amount of power generation per unit area may exceed an allowable value in another region where there is no insufficient water content. Hereinafter, in the membrane electrode assembly, the fact that the amount of power generation per unit area locally exceeds an allowable value is termed "power generation locally concentrates" or "local power generation concentration". Then, the power generation concentration leads to local degradation of the membrane electrode assembly. In addition, in an oxidant gas flow passage for flowing oxidant gas along the surface of the cathode, for example, there may occur a nonuniform power generation distribution caused by a nonuniform distribution of residual water that is produced during power generation and remains as liquid. Then, when there is a locally excessive amount of residual water in the oxidant gas flow passage, oxidant gas supplied to part of region of the cathode becomes insufficient, so power generation locally concentrates in another region where oxidant gas supplied is not insufficient to thereby lead to local degradation of the membrane electrode assembly. This also applies to a fuel gas flow passage for flowing fuel gas along the surface of the anode. That is, local power generation concentration due to a water distribution (the above described water content distribution and residual water distribution) within the plane of the membrane electrode assembly leads to local degradation of the membrane electrode assembly. In addition, a nonuniform temperature distribution within the plane of the membrane electrode assembly also causes a nonuniform power generation distribution to thereby lead to local degradation of the membrane electrode assembly. Then, local degradation of the membrane electrode assembly leads to early degradation of the fuel cell as a whole.

Then, various techniques for uniformizing a power generation distribution within the plane of the membrane electrode assembly have been suggested. For example, Japanese Patent Application Publication No. 2007-317553 (JP-A-2007-317553) describes a technique for a fuel cell system, in which temperature measuring means and cell voltage measuring means are provided at least two positions along a direction in which oxidant gas flows within a power generation plane of a cell (fuel cell), a nonuniform power generation distribution within the power generation plane is estimated on the basis of a temperature difference measured by the temperature measuring means and a voltage difference measured by the cell voltage measuring means and then the amount of coolant or oxidant gas supplied to the fuel cell is increased as the nonuniform power generation distribution increases. Then, JP-A-2007-317553 describes that, with the above technique, it is possible to reduce the influence of a temperature increase due to local current concentration within the power generation plane resulting from a significant nonuniform power generation distribution.

However, in the technique described in JP-A-2007-317553, local power generation concentration within the plane of the membrane electrode assembly due to a water distribution as described above is not considered. In addition, in the technique described in JP-A-2007-317553, the temperature measuring means and the cell voltage detecting means are provided within the power generation plane of the cell, so there is a problem that the configuration of the fuel cell is complex or the temperature measuring means and the cell voltage detecting means interfere with gas flowing within the power generation plane.

SUMMARY OF THE INVENTION

The invention provides a fuel cell system and a control method for a fuel cell system that suppress local degradation of a membrane electrode assembly resulting from local power generation concentration within a plane of the membrane electrode assembly due to a water distribution in a polymer electrolyte fuel cell.

The invention is contemplated to solve at least part of the above described problems, and may be implemented as embodiments described below.

An aspect of the invention provides a fuel cell system that includes: a fuel cell that has a membrane electrode assembly in which an anode and a cathode are respectively bonded to both surfaces of an electrolyte membrane formed of a solid polymer, a fuel gas flow passage for flowing fuel gas along a surface of the anode and an oxidant gas flow passage for flowing oxidant gas along a surface of the cathode; a fuel gas supply/exhaust unit that supplies fuel gas to the anode and exhausts anode offgas, exhausted from the anode, via the fuel gas flow passage; and an oxidant gas supply/exhaust unit that supplies oxidant gas to the cathode and exhaust cathode offgas, exhausted from the cathode, via the oxidant gas flow passage. The fuel cell system includes: a power generation concentration determining unit that is configured to determine whether there is a phenomenon in the fuel cell resulting from local power generation concentration within a plane of the membrane electrode assembly due to a water distribution, including a water content distribution within a plane of the electrolyte membrane, a residual water distribution in the fuel gas flow passage and a residual water distribution in the oxidant gas flow passage; and a control unit that is configured to control at least one of the fuel gas supply/exhaust unit and the oxidant gas supply/exhaust unit so as to eliminate the phenomenon when the power generation concentration determining unit determines that there is the phenomenon.

With the thus configured fuel cell system, it is possible to suppress local degradation of the membrane electrode assembly resulting from local power generation concentration within the plane of the membrane electrode assembly due to a water distribution.

In addition, in the fuel cell system, the fuel cell may include a frame member that is provided at an outer peripheral portion of the membrane electrode assembly; a first temperature sensor that is provided at a first portion of the frame member and that is used to detect a temperature of the first portion; and a second temperature sensor that is provided at a second portion of the frame member, which is higher in temperature than the first portion, and that is used to detect a temperature of the second portion, the power generation concentration determining unit may be configured to determine whether a difference between the temperature of the second portion and the temperature of the first portion is larger than a predetermined threshold, and, when the difference between the temperature of the second portion and the temperature of the first portion is larger than the predetermined threshold, the control unit may be configured to control at least one of the fuel gas supply/exhaust unit and the oxidant gas supply/exhaust unit so that the difference between the temperature of the second portion and the temperature of the first portion becomes smaller than or equal to the predetermined threshold.

The membrane electrode assembly generates heat by the electrochemical reaction between fuel gas and oxidant gas during power generation, and the generated heat transfers to the frame member. Then, when there is no local power generation concentration due to the water distribution within the plane of the membrane electrode assembly, a nonuniform temperature distribution within the plane of the membrane electrode assembly is relatively small. Therefore, a nonuniform temperature distribution in the frame member is also relatively small. On the other hand, when there is local power generation concentration due to the water distribution within the plane of the membrane electrode assembly, generated heat locally increases, so there occurs a relatively large nonuniform temperature distribution within the plane of the membrane electrode assembly. Therefore, there is also a relatively large nonuniform temperature distribution in the frame member.

With the thus configured fuel cell system, when the difference between the temperature of the second portion and the temperature of the first portion in the frame member is larger than a predetermined threshold, it may be determined that there is the power generation concentration within the plane of the membrane electrode assembly. Thus, it is possible to determine whether there is the power generation concentration (whether there is a phenomenon resulting from the power generation concentration) through simple computation. Then, it is possible to eliminate the power generation concentration. In addition, when the threshold is set to a relatively small value, it is possible to avoid the power generation concentration.

In addition, with the thus configured fuel cell system, the first temperature sensor and the second temperature sensor are not provided within the plane of the membrane electrode assembly but provided for the frame member, so, in comparison with the case where the first temperature sensor and the second temperature sensor are provided within the plane of the membrane electrode assembly, it is possible to prevent a complex configuration of the fuel cell, and it is possible to avoid interference with gas flow on the surfaces of the membrane electrode assembly.

In addition, in the fuel cell system, the control unit may be further configured to determine a control value for at least the oxidant gas supply/exhaust unit out of the fuel gas supply/exhaust unit and the oxidant gas supply/exhaust unit on the basis of a difference between the predetermined threshold and the difference between the temperature of the second portion and the temperature of the first portion.

The control value may be various parameters, such as a flow rate of oxidant gas supplied to the cathode, a back pressure of cathode offgas, a flow rate of fuel gas supplied to the anode and a duration during which these controls are continued.

As described above, when there is local power generation concentration due to the water distribution within the plane of the membrane electrode assembly, generated heat locally increases, so there occurs a relatively large nonuniform temperature distribution within the plane of the membrane electrode assembly. Therefore, there is a relatively large nonuniform temperature distribution in the frame member. Furthermore, as the degree of the power generation concentration increases, a nonuniform temperature distribution within the plane of the membrane electrode assembly increases.

With the thus configured fuel cell system, as the difference between the temperature of the second portion and the temperature of the first portion increases with respect to the predetermined threshold, the degree of local power generation concentration due to a water content distribution within the plane of the electrolyte membrane is estimated to be larger. Then, the control unit determines a control value for at least the oxidant gas supply/exhaust unit out of the fuel gas supply/exhaust unit and the oxidant gas supply/exhaust unit so as to eliminate the locally insufficient water content on the basis of the degree of the power generation concentration, that is, the difference between the predetermined threshold and the difference between the temperature of the second portion and the temperature of the first portion. Thus, it is possible to more effectively and quickly eliminate the power generation concentration as compared with when the control value is not set on the basis of the degree of the power generation concentration but set to a predetermined value. As a result, energy required in the control is suppressed, and it is possible to suppress a decrease in energy efficiency in the fuel cell system.

In addition, in the fuel cell system, the first portion may be a portion located adjacent to a portion from which the oxidant gas is introduced into the cathode, and the second portion may be a portion located adjacent to a portion from which the cathode offgas is exhausted from the cathode.

Here, the "portion located adjacent to the portion from which the oxidant gas is introduced into the cathode" may be, for example, a portion within the upstream-side one-quarter range in the flow direction of the oxidant gas. In addition, the "portion located adjacent to the portion from which the cathode offgas is exhausted from the cathode" may be, for example, a portion within the downstream-side one-quarter range in the flow direction of the oxidant gas.

Within the plane of the membrane electrode assembly, as a portion approaches the portion from which the oxidant gas is introduced into the cathode, an insufficient water content tends to easily occur within the plane of the electrolyte membrane; whereas, as a portion approaches the portion from which the cathode offgas is exhausted from the cathode, an insufficient water content tends to be hard to occur within the plane of the electrolyte membrane. Therefore, within the plane of the membrane electrode assembly, as a portion approaches the portion from which the oxidant gas is introduced into the cathode, heat generated during power generation reduces and the temperature tends to decrease; whereas, as a portion approaches the portion from which the cathode offgas is exhausted from the cathode, heat generated during power generation increases and the temperature tends to increase.

With the thus configured fuel cell system, the first portion is the portion located adjacent to the portion at which the temperature easily decreases within the plane of the membrane electrode assembly, and the second portion is the portion located adjacent to the portion at which the temperature easily increases within the plane of the membrane electrode assembly, so the temperature difference between the first portion and the second portion is relatively large. Thus, it is possible to reduce adverse influence of detection errors of the first and second temperature sensors on the determination.

Note that, with the thus configured fuel cell system, the power generation concentration determining unit makes the determination on the basis of the difference between the temperature of the second portion and the temperature of the first portion; instead, for example, the power generation concentration determining unit may make the determination on the basis of the ratio between the temperature of the second portion and the temperature of the first portion. By so doing as well, it is possible to obtain the same advantageous effect as that of the above described fuel cell system.

In addition, in the fuel cell system, the power generation concentration determining unit may be configured to estimate a water content at a predetermined portion within the plane of the electrolyte membrane on the basis of an operating condition of the fuel cell and then to determine whether the water content is smaller than a threshold defined for each operating condition of the fuel cell, and, when the water content is smaller than the threshold, the control unit may be configured to control at least the oxidant gas supply/exhaust unit out of the fuel gas supply/exhaust unit and the oxidant gas supply/exhaust unit so that the water content becomes larger than or equal to the threshold.

Here, the "operating condition of the fuel cell" may be various parameters, such as a current value output from the fuel cell, a flow rate of fuel gas supplied to the anode, a pressure of fuel gas supplied to the anode, a flow rate of oxidant gas supplied to the cathode, a back pressure of cathode offgas, a temperature of coolant supplied to the fuel cell and a temperature of coolant exhausted from the fuel cell. This also applies to other application examples described below.

With the thus configured fuel cell system, the water content is estimated, and, when the water content is smaller than the threshold defined for each operating condition of the fuel cell, it may be determined that there is local power generation concentration due to a water content distribution within the plane of the electrolyte membrane within the plane of the membrane electrode assembly. Then, it is possible to eliminate the power generation concentration. In addition, when the threshold is set to a relatively large value, it is possible to avoid the power generation concentration.

Note that the water content at the predetermined portion within the plane of the electrolyte membrane may be estimated using a function or map having the above described various parameters in the operating condition of the fuel cell as variables.

In addition, in the fuel cell system, the control unit may be configured to determine a control value for at least the oxidant gas supply/exhaust unit out of the fuel gas supply/exhaust unit and the oxidant gas supply/exhaust unit on the basis of a difference between the threshold and the water content.

The control value may be various parameters, such as a flow rate of oxidant gas supplied to the cathode, a back pressure of cathode offgas, a flow rate of fuel gas supplied to the anode and a duration during which these controls are continued.

With the thus configured fuel cell system, as the water content reduces with respect to the threshold defined for each operating condition of the fuel cell, the degree of local power generation concentration due to a water content distribution within the plane of the electrolyte membrane is estimated to be larger. Then, the control unit determines a control value for at least the oxidant gas supply/exhaust unit out of the fuel gas supply/exhaust unit and the oxidant gas supply/exhaust unit so as to eliminate the locally insufficient water content on the basis of the degree of the power generation concentration, that is, the difference between the threshold and the water content. Thus, it is possible to more effectively and quickly eliminate the power generation concentration as compared with when the control value is not set on the basis of the degree of the power generation concentration but set to a predetermined value. As a result, energy required in the control is suppressed, and it is possible to suppress a decrease in energy efficiency in the fuel cell system.

In addition, in the fuel cell system, the predetermined portion may be a portion of which a water content easily reduces within the plane of the electrolyte membrane during operation of the fuel cell.

During operation of the fuel cell, at the portion at which the water content easily reduces within the plane of the electrolyte membrane, the water content of the electrolyte membrane easily varies in response to the operating condition of the fuel cell. The power generation concentration determining unit estimates the water content at the portion at which the water content easily reduces within the plane of the electrolyte membrane, so it is possible to make the determination with high sensitivity.

In addition, in the fuel cell system, the power generation concentration determining unit may be configured to estimate a distribution of a transfer amount of water that transfers between the anode and the cathode across the electrolyte membrane in a flow direction of the oxidant gas in the cathode on the basis of an operating condition of the fuel cell, and may be configured to determine whether a distance between a portion from which the cathode offgas is exhausted and a portion at which the transfer amount of the water is zero is shorter than a predetermined threshold, and, when the distance between the portion from which the cathode offgas is exhausted and the portion at which the transfer amount of the water is zero is shorter than the predetermined threshold, the control unit may be configured to control at least the oxidant gas supply/exhaust unit out of the fuel gas supply/exhaust unit and the oxidant gas supply/exhaust unit so that the distance between the portion from which the cathode offgas is exhausted and the portion at which the transfer amount of the water is zero becomes longer than or equal to the predetermined threshold.

The inventors repeatedly conducted simulations for estimating a distribution of a transfer amount of water that transfers between the anode and the cathode across the electrolyte membrane in a flow direction of oxidant gas in the cathode under various operating conditions of the above described fuel cell and experiments for the power generation concentration. As a result, the inventors have found that, as the distance between the portion from which the cathode offgas is exhausted and the portion at which the transfer amount of the water is zero reduces, the power generation concentration occurs; whereas, as the distance between the portion from which the cathode offgas is exhausted and the portion at which the transfer amount of the water is zero increases, the power generation concentration does not occur. Note that a distribution of the transfer amount of water that transfers between the anode and the cathode across the electrolyte membrane may be estimated using a function or map having the above described various parameters in the operating condition of the fuel cell as variables, as in the case of the estimation of the water content in the above described fuel cell system.

With the thus configured fuel cell system, when the distance between the portion from which cathode offgas is exhausted and the portion at which the transfer amount of water is zero is shorter than a predetermined threshold, it may be determined that there is local power generation concentration due to a water content distribution within the plane of the electrolyte membrane within the plane of the membrane electrode assembly. Then, it is possible to eliminate the power generation concentration. In addition, when the threshold is set to a relatively large value, it is possible to avoid the power generation concentration.

In addition, in the fuel cell system, the control unit may be configured to determine a control value for at least the oxidant gas supply/exhaust unit out of the fuel gas supply/exhaust unit and the oxidant gas supply/exhaust unit on the basis of a difference between the predetermined threshold and the distance between the portion from which the cathode offgas is exhausted and the portion at which the transfer amount of the water is zero.

With the thus configured fuel cell system, as the distance between the portion from which the cathode offgas is exhausted and the portion at which the transfer amount of water is zero reduces with respect to the predetermined threshold, the degree of local power generation concentration due to a water content distribution within the plane of the electrolyte membrane is estimated to be larger. Then, the control unit determines a control value for at least the oxidant gas supply/exhaust unit out of the fuel gas supply/exhaust unit and the oxidant gas supply/exhaust unit so as to eliminate the locally insufficient water content on the basis of the degree of the power generation concentration, that is, the difference between the predetermined threshold and the distance between the portion from which the cathode offgas is exhausted and the portion at which the transfer amount of water is zero. Thus, it is possible to more effectively and quickly eliminate the power generation concentration as compared with when the control value is not set on the basis of the degree of the power generation concentration but set to a predetermined value. As a result, energy required in the control is suppressed, and it is possible to suppress a decrease in energy efficiency in the fuel cell system.

In addition, in the fuel cell system, the power generation concentration determining unit may be configured to estimate a distribution of a transfer amount of water that transfers between the anode and the cathode across the electrolyte membrane in a flow direction of the oxidant gas in the cathode on the basis of an operating condition of the fuel cell, may be configured to obtain a function that expresses the distribution of the transfer amount of the water and may be configured to determine whether the function has a point of inflection, and, when the function has a point of inflection, the control unit may be configured to control at least the oxidant gas supply/exhaust unit out of the fuel gas supply/exhaust unit and the oxidant gas supply/exhaust unit so as to eliminate the point of inflection.

The inventors repeatedly conducted simulations for estimating a distribution of a transfer amount of water that transfers between the anode and the cathode across the electrolyte membrane in a flow direction of oxidant gas in the cathode under various operating conditions of the above described fuel cell and experiments for the power generation concentration. As a result, the inventors have found that there is the power generation concentration when the function that expresses the distribution of the transfer amount of the water has a point of inflection; whereas there is no power generation concentration when the function has no point of inflection. Note that a distribution of the transfer amount of water that transfers between the anode and the cathode across the electrolyte membrane may be estimated using a function or map having the above described various parameters in the operating condition of the fuel cell as variables.

With the thus configured fuel cell system, when the function that expresses the distribution of the transfer amount of the water has a point of inflection, it may be determined that there is local power generation concentration due to a water content distribution within the plane of the electrolyte membrane within the plane of the membrane electrode assembly. Then, it is possible to eliminate the power generation concentration.

In addition, in the fuel cell system, the power generation concentration determining unit may be configured to obtain a peak current within the plane of the membrane electrode assembly on the basis of an operating condition of the fuel cell, and may be configured to determine whether the peak current is larger than a threshold defined for each operating condition of the fuel cell, and, when the peak current is larger than the threshold, the control unit may be configured to control at least one of the fuel gas supply/exhaust unit and the oxidant gas supply/exhaust unit so that the peak current becomes smaller than or equal to the threshold.

With the thus configured fuel cell system, when the peak current within the plane of the membrane electrode assembly is larger than the predetermined threshold, it may be determined that there is local power generation concentration due to the water distribution within the plane of the membrane electrode assembly. Then, it is possible to eliminate the power generation concentration. In addition, when the threshold is set to a relatively small value, it is possible to avoid the power generation concentration.

Note that the peak current within the plane of the membrane electrode assembly may be, for example, estimated using a function or map having the above described various parameters in the operating condition of the fuel cell as variables.

In addition, in the fuel cell system, the power generation concentration determining unit may be configured to obtain a standard deviation of a current density distribution within the plane of the membrane electrode assembly on the basis of an operating condition of the fuel cell, and may be configured to determine whether the standard deviation is larger than a predetermined threshold, and, when the standard deviation is larger than the predetermined threshold, the control unit may be configured to control at least one of the fuel gas supply/exhaust unit and the oxidant gas supply/exhaust unit so that the standard deviation becomes smaller than or equal to the predetermined threshold.

With the thus configured fuel cell system, when the standard deviation of a current density distribution within the plane of the membrane electrode assembly is larger than the predetermined threshold, it may be determined that there is local power generation concentration due to the water distribution within the plane of the membrane electrode assembly. Then, it is possible to eliminate the power generation concentration. In addition, when the threshold is set to a relatively small value, it is possible to avoid the power generation concentration.

Note that the current density within the plane of the membrane electrode assembly may be estimated using a function or map having the above described various parameters in the operating condition of the fuel cell as variables.

When there is local power generation concentration due to the water distribution within the plane of the membrane electrode assembly, the effective power generation area reduces, so the output power of the fuel cell mostly decreases below a desired output power. Thus, each of the above described fuel cell systems may further include an output power detecting unit that is configured to detect the output power of the fuel cell to cause the power generation concentration determining unit to make determination in consideration of a decrease in the output power of the fuel cell. In addition, when there is local power generation concentration due to the water distribution within the plane of the membrane electrode assembly, the impedance of the fuel cell increases with respect to a desired value or steeply varies in a short period of time. Thus, each of the above described fuel cell systems may further include an impedance detecting unit that is configured to detect the impedance of the fuel cell to cause the power generation concentration determining unit to make determination in consideration of the impedance of the fuel cell.

In addition, in the fuel cell system, the power generation concentration determining unit may be further configured to estimate the water distribution on the basis of an operating condition of the fuel cell, and may be configured to determine on the basis of the estimated water distribution whether a cause of the power generation concentration is a locally insufficient water content in the electrolyte membrane, a locally excessive amount of residual water in the fuel gas flow passage or a locally excessive amount of residual water in the oxidant gas flow passage, and the control unit may be configured to control at least one of the fuel gas supply/exhaust unit and the oxidant gas supply/exhaust unit on the basis of the determined cause of the power generation concentration.

With the thus configured fuel cell system, the power generation concentration determining unit determines the cause of local power generation concentration due to the water distribution on the basis of the operating condition of the above described fuel cell, so the control unit is able to appropriately control at least one of the fuel gas supply/exhaust unit and the oxidant gas supply/exhaust unit so as to eliminate the power generation concentration on the basis of the determined cause of the power generation concentration.

Note that the water content, including a water content distribution within the plane of the electrolyte membrane, a residual water distribution in the fuel gas flow passage and a residual water distribution in the oxidant gas flow passage, may be estimated using a function or map having the above described various parameters in the operating condition of the fuel cell as variables.

In addition, in the fuel cell system, when it is determined that the cause of the power generation concentration is a locally insufficient water content in the electrolyte membrane, the control unit may be configured to control the oxidant gas supply/exhaust unit so as to reduce a flow rate of the oxidant gas supplied to the cathode.

With the thus configured fuel cell system, evaporation of water from the electrolyte membrane is suppressed to thereby make it possible to eliminate local power generation concentration due to a locally insufficient water content in the electrolyte membrane.

In addition, in the fuel cell system, when it is determined that the cause of the power generation concentration is a locally insufficient water content in the electrolyte membrane, the control unit may be configured to control the oxidant gas supply/exhaust unit so as to increase a back pressure of the cathode offgas.

With the thus configured fuel cell system, evaporation of water from the electrolyte membrane is suppressed to thereby make it possible to eliminate local power generation concentration due to a locally insufficient water content in the electrolyte membrane.

In addition, in the fuel cell system, when it is determined that the cause of the power generation concentration is a locally insufficient water content in the electrolyte membrane, the control unit may be configured to control the fuel gas supply/exhaust unit so as to increase a flow rate of the fuel gas supplied to the anode.

With the thus configured fuel cell system, the power generation amount in the membrane electrode assembly is increased to increase the amount of produced water to thereby make it possible to eliminate local power generation concentration due to the locally insufficient water content in the electrolyte membrane.

In addition, in the fuel cell system, when it is determined that the cause of the power generation concentration is a locally excessive amount of residual water in the fuel gas flow passage, the control unit may be configured to control the fuel gas supply/exhaust unit so as to increase a flow rate of the fuel gas supplied to the anode.

With the thus configured fuel cell system, liquid water locally remaining in the fuel gas flow passage is drained outside the fuel cell to thereby make it possible to eliminate local power generation concentration due to the locally excessive amount of residual water in the fuel gas flow passage.

In addition, in the fuel cell system, when it is determined that the cause of the power generation concentration is a locally excessive amount of residual water in the oxidant gas flow passage, the control unit may be configured to control the oxidant gas supply/exhaust unit so as to increase a flow rate of the oxidant gas supplied to the cathode.

With the thus configured fuel cell system, liquid water locally remaining in the oxidant gas flow passage is drained outside the fuel cell to thereby make it possible to eliminate local power generation concentration due to the locally excessive amount of residual water in the oxidant gas flow passage.

Furthermore, in the fuel cell system, when it is determined that the cause of the power generation concentration is a locally excessive amount of residual water in the oxidant gas flow passage, the control unit may be configured to control the oxidant gas supply/exhaust unit so as to reduce a back pressure of the cathode offgas.

With the thus configured fuel cell system as well, liquid water locally remaining in the oxidant gas flow passage is drained outside the fuel cell to thereby make it possible to eliminate local power generation concentration due to the locally excessive amount of residual water in the oxidant gas flow passage.

The aspect of the invention does not need to include all of the above described various features, but it may be configured by omitting part of the features or appropriately combine some of the features. In addition, the aspect of the invention may be configured as an aspect of the invention of a control method for a fuel cell system in addition to the configuration of the above described fuel cell system. In addition, the aspect of the invention may be implemented in various forms, such as a computer program that implements those features, a recording medium that records the program and a data signal that includes the program and that is implemented in a carrier wave. Note that, in each of the aspects, various additional elements described above may be applied.

When the aspect of the invention is implemented as a computer program, a recording medium in which the computer program is recorded, or the like, it may be implemented as the entire program that controls the operation of the fuel cell system or may be implemented as only part of the program that achieves the function of the invention. In addition, the recording medium may be various computer-readable media, such as a flexible disk, a CD-ROM, a DVD-ROM, a magneto-optical disk, an IC card, a ROM cartridge, a punched card, print on which code such as bar code is printed, an internal storage device (memory such as a RAM and a ROM) and external storage device of a computer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a flowchart that shows the flow of power generation concentration suppressing control process executed in a fuel cell system according to a third embodiment;

FIG. 18 is a graph that illustrates the correlation between the back pressure of anode offgas and a standard deviation of a current density distribution under various operating conditions of a fuel cell stack according to the sixth embodiment.

DETAILED DESCRIPTION OF EMBODIMENTS

Figure 1:
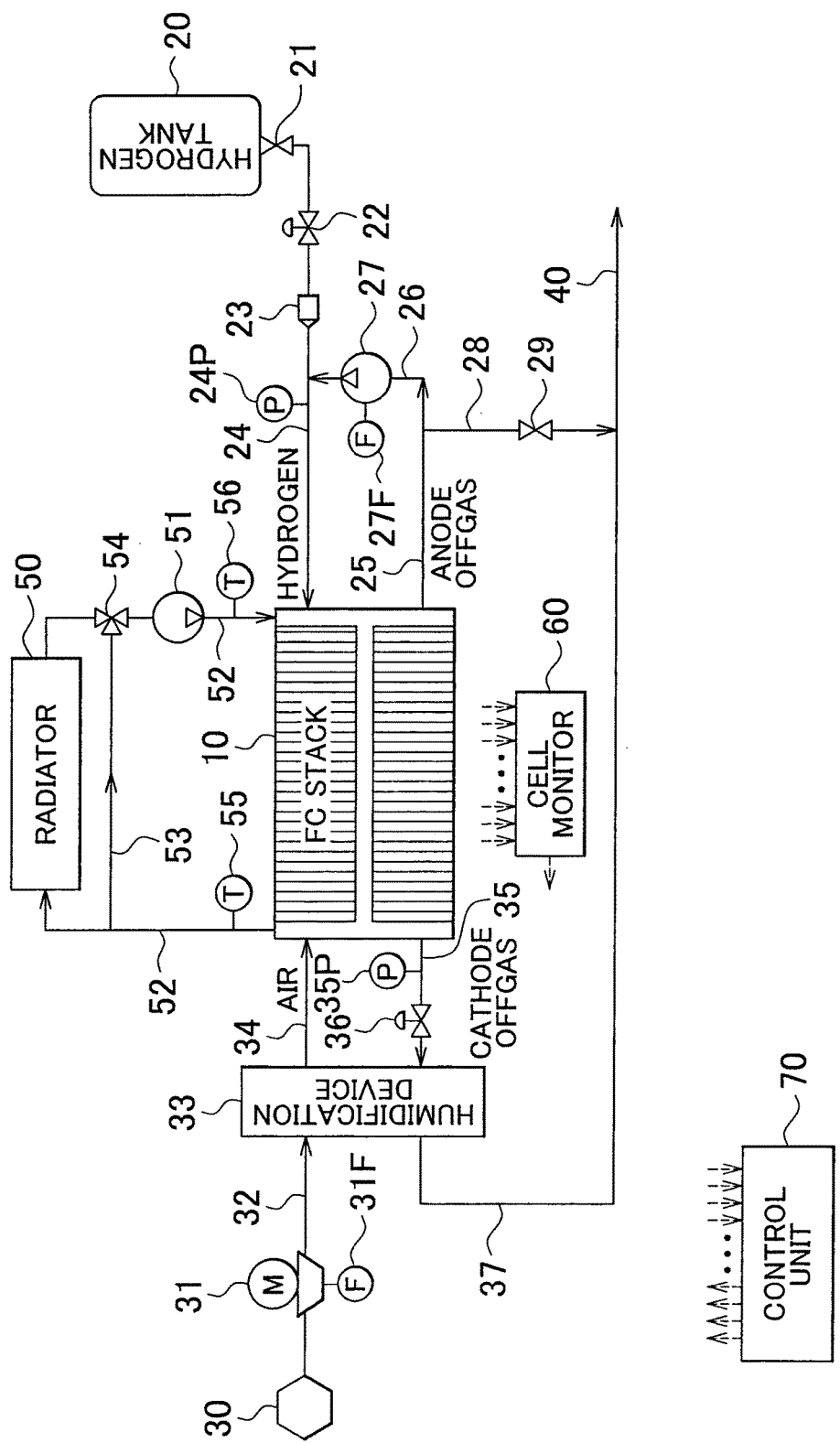
FIG. 1 is a view that illustrates the schematic configuration of a fuel cell system according to a first embodiment of the invention.

Hereinafter, an embodiment of the invention will be described with reference to specific embodiments. A first embodiment will be described. FIG. 1 is a view that illustrates the schematic configuration of a fuel cell system 100 according to the first embodiment of the invention. In the fuel cell system 100, a fuel cell (FC) stack 10 has a plurality of stacked cells that generate electric power by the electrochemical reaction between hydrogen (fuel gas) and oxygen (oxidant gas). Each cell includes a membrane electrode assembly, a fuel gas flow passage, an oxidant gas flow passage and a coolant flow passage (not shown). The membrane electrode assembly is formed so that an anode and a cathode are bonded to both surfaces of an electrolyte membrane having proton conductivity. The fuel gas flow passage is used to flow hydrogen along the surface of the anode. The oxidant gas flow passage is used to flow air along the surface of the cathode. The coolant flow passage is used to flow coolant. In the first embodiment, a polymer electrolyte membrane, such as Nafion (trademark; ion exchange membrane), is used as the electrolyte membrane.

Hydrogen, which serves as fuel gas, is supplied from a hydrogen tank 20 that stores high-pressure hydrogen to the anode of the fuel cell stack 10 via a hydrogen supply line 24. Instead of the hydrogen tank 20, for example, a hydrogen producing device that produces hydrogen by a reforming reaction that uses alcohol, hydrocarbon, aldehyde, or the like, as a raw material may be used.

High-pressure hydrogen stored in the hydrogen tank 20 is adjusted in pressure and supplied amount by a shut valve 21, a regulator valve 22, an injector 23, and the like, and is supplied to the anodes of the fuel cell stack 10. The shut valve 21 is provided at the outlet of the hydrogen tank 20. Note that a pressure sensor 24P is arranged in the hydrogen supply line 24, and is used to detect the pressure in the hydrogen supply line 24.

Then, exhaust gas from the anodes (hereinafter, referred to as anode offgas) is exhausted to an anode offgas exhaust line 25. Anode offgas that is exhausted to the anode offgas exhaust line 25 and that includes hydrogen not consumed in power generation may be recirculated to the hydrogen supply line 24 via a circulation line 26. Note that the pressure of anode offgas is relatively low as a result that hydrogen is consumed through power generation in the fuel cell stack 10. Therefore, a hydrogen circulation pump 27 is arranged in the circulation line 26, and is used to pressurize anode offgas when anode offgas is recirculated. A flow rate sensor 27F is provided for the hydrogen circulation pump 27, and is used to detect the circulation flow rate of anode offgas. A line 28 is branched from the anode offgas exhaust line 25, and a purge valve 29 is arranged in the line 28. While the purge valve 29 is closed, anode offgas that includes hydrogen not consumed in power generation is recirculated to the fuel cell stack 10 via the circulation line 26. By so doing, hydrogen may be effectively utilized.

During recirculation of anode offgas, hydrogen is consumed in power generation, while impurities other than hydrogen, such as nitrogen that permeates from the cathodes to the anodes via the electrolyte membranes, remain and are not consumed, so the concentration of impurities in anode offgas gradually increases. At this time, when the purge valve 29 is opened, anode offgas is exhausted outside the fuel cell system 100 together with cathode offgas (described later) via the lines 28 and 40. By so doing, the concentration of impurities in anode offgas may be reduced.

The hydrogen tank 20, the shut valve 21, the regulator valve 22, the injector 23, the hydrogen supply line 24, the pressure sensor 24P, the anode offgas exhaust line 25, the circulation line 26, the hydrogen circulation pump 27, the flow rate sensor 27F, the line 28, the purge valve 29 and the line 40 constitute one example of a fuel gas supply/exhaust unit.

Compressed air, which serves as oxidant gas containing oxygen, is supplied to the cathodes of the fuel cell stack 10. Air is taken in from an air cleaner 30, compressed by an air compressor 31, introduced into a humidification device 33 via a line 32, humidified by the humidification device 33, and then supplied from an air supply line 34 to the cathodes of the fuel cell stack 10. A flow rate sensor 31F is provided for the air compressor 31, and is used to detect the flow rate of air supplied.

Exhaust gas from the cathodes (hereinafter, referred to as cathode offgas) flows out to a line 35. A pressure sensor 35P and a pressure regulating valve 36 are arranged in the line 35. The pressure sensor 35P is used to detect the back pressure of cathode offgas. The pressure regulating valve 36 is used to regulate the back pressure of cathode offgas. High-humidity cathode offgas flowing out from the fuel cell system 100 to the line 35 is introduced into the humidification device 33, utilized to humidify air and then exhausted outside the fuel cell system 100 via a line 37 and the line 40.

The air cleaner 30, the air compressor 31, the flow rate sensor 31F, the line 32, the humidification device 33, the air supply line 34, the line 35, the pressure sensor 35P, the pressure regulating valve 36, the line 37 and the line 40 constitute one example of an oxidant gas supply/exhaust unit.

The fuel cell stack 10 generates heat by the above described electrochemical reaction. Therefore, in order to keep the temperature of the fuel cell stack 10 at a temperature appropriate for power generation, coolant is also supplied to the fuel cell stack 10. The coolant, pumped by a water pump 51, flows through a coolant line 52 and is cooled by a radiator 50. The cooled coolant is supplied to the fuel cell stack 10. As shown in the drawing, a bypass line 53 for circulating coolant without passing through the radiator 50 is connected to the line 52, and, in addition, a rotary valve 54 is arranged at one of connecting portions between the line 52 and the bypass line 53. By switching the rotary valve 54, coolant may be circulated via the line 52 and the bypass line 53 without passing through the radiator 50. Note that, as shown in the drawing, a temperature sensor 55 is arranged in the line 52 at a portion upstream of the radiator 50 in the flow direction of coolant, and is used to detect the temperature of coolant drained from the fuel cell stack 10. In addition, a temperature sensor 56 is arranged in the line 52 at a portion downstream of the water pump 51 in the flow direction of coolant, and is used to detect the temperature of coolant supplied to the fuel cell stack 10.

In addition, a cell monitor 60 is connected to the fuel cell stack 10. The cell monitor 60 detects the voltage, current, impedance, and the like, of each cell in the fuel cell stack 10.

The operation of the fuel cell system 100 is controlled by a control unit 70. The control unit 70 is formed of a microcomputer that includes a CPU, a RAM, a ROM, and the like, inside, and controls the operation of the system in accordance with programs stored in the ROM. The ROM also stores various maps, thresholds, and the like, used in control over the fuel cell system 100 in addition to the above programs. Specifically, the control unit 70, for example, controls the operation of the system, including power generation concentration suppressing control process (described later), such as actuation of various valves, hydrogen circulation pump 27, water pump 51 and air compressor 31, on the basis of an output power required of the fuel cell stack 10, outputs of various sensors, and the like. The control unit 70 constitutes one example of a power generation concentration determining unit and one example of a control unit.

In the fuel cell system 100 according to the first embodiment, as described above, the fuel cell stack 10 includes membrane electrode assemblies that use a polymer electrolyte membrane as an electrolyte membrane, so, in order to obtain desired power generation performance, it is necessary to keep the electrolyte membranes at an appropriate wet state to appropriately maintain the proton conductivity of each electrolyte membrane. However, during power generation, there may occur a nonuniform water content distribution (nonuniform distribution of wet state) within the plane of each electrolyte membrane, and the nonuniform water content distribution may cause a nonuniform power generation distribution. Then, when there is a locally insufficient water content within the plane of any one of the electrolyte membranes, local power generation concentration occurs in another region where there is no insufficient water content to thereby lead to local degradation of a corresponding one of the membrane electrode assemblies.

Figure 2A:
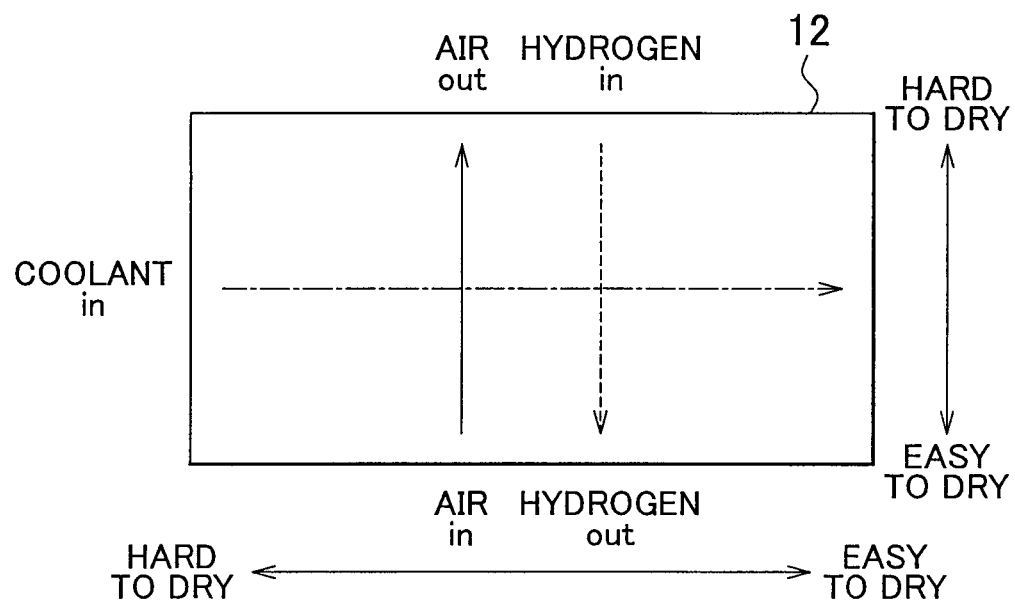
FIG. 2A and FIG. 2B are views that illustrate an example of power generation concentration that occurs in a membrane electrode assembly that is a component of a fuel cell stack according to the first embodiment.
Figure 2B:
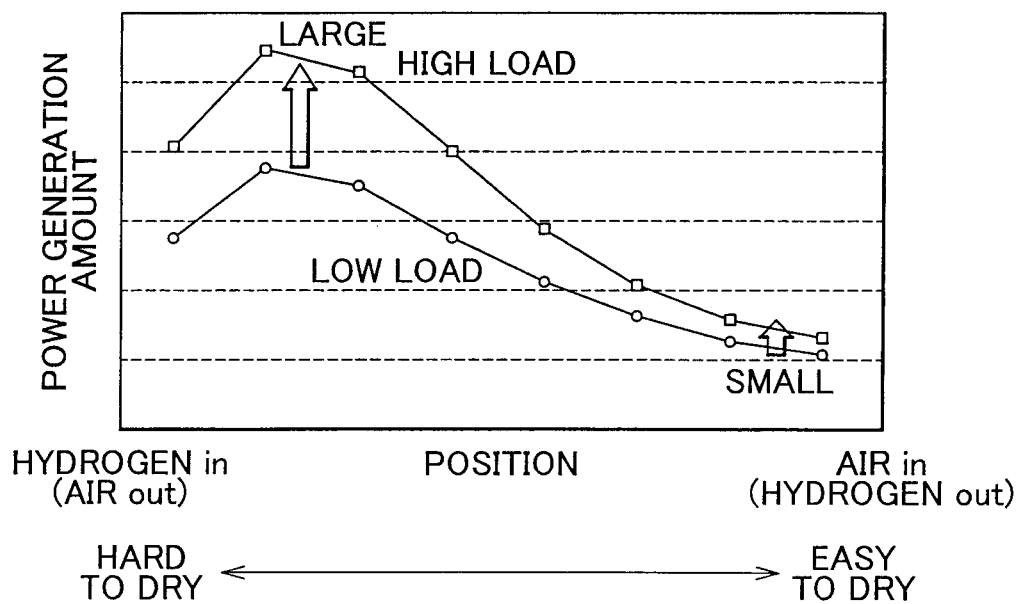

FIG. 2A and FIG. 2B are views that illustrate an example of power generation concentration that occurs in a membrane electrode assembly. FIG. 2A shows the shape of a membrane electrode assembly 12 in the fuel cell stack 10 according to the first embodiment, the flow directions of hydrogen and air on the surface of the membrane electrode assembly 12, the flow direction of coolant in the cell, and the like. In addition, FIG. 2B shows a power generation distribution in the flow directions of hydrogen and air in the membrane electrode assembly 12 and a state of power generation concentration.

As shown in FIG. 2A, in the first embodiment, the membrane electrode assembly 12 has a rectangular shape. Then, on the surface of the membrane electrode assembly 12, a fuel gas flow passage and an oxidant gas flow passage are provided so that hydrogen and air flow in opposite directions along the short side of the membrane electrode assembly 12. In the above membrane electrode assembly 12, a portion of the electrolyte membrane is easier to dry as the portion approaches the upstream side in the flow direction of air; whereas a portion of the electrolyte membrane is harder to dry as the portion approaches the downstream side. In other words, within the plane of the membrane electrode assembly 12, the water content of a portion of the electrolyte membrane reduces as the portion approaches the upstream side in the flow direction of air, and the water content of a portion of the electrolyte membrane increases as the portion approaches the downstream side. In addition, in the first embodiment, the flow direction of coolant in the cell is set in a direction along the long side of the membrane electrode assembly 12. Then, a portion of the electrolyte membrane is harder to dry as the portion approaches the upstream side in the flow direction of coolant, and a portion of the electrolyte membrane more easily dries as it approaches the downstream side. That is, the water content of a portion of the electrolyte membrane increases as the portion approaches the upstream side in the flow direction of coolant, and the water content of a portion of the electrolyte membrane reduces as the portion approaches the downstream side.

Then, as shown in FIG. 2B, in the membrane electrode assembly 12, because of a water content distribution within the plane of the electrolyte, the amount of power generation reduces as a portion of the electrolyte approaches the upstream side in the flow direction of air, and the amount of power generation increases as a portion of the electrolyte approaches the downstream side. Furthermore, when an output power required of the fuel cell stack 10 increases, that is, when the required output power changes from a low load state ("O") where the required output power is relatively low to a high load state ("□") where the required output power is relatively high, an increase in the amount of power generation is relatively small at the upstream side in the flow direction of air where the water content of the electrolyte membrane is relatively small within the plane of the membrane electrode assembly 12; whereas an increase in the amount of power generation is relatively large at the downstream side in the flow direction of air where the water content of the electrolyte membrane is relatively large. That is, within the plane of the membrane electrode assembly 12, there occurs local power generation concentration due to a water content distribution within the plane of the electrolyte membrane.

Although not shown in the drawing or described in details, in the fuel gas flow passage or the oxidant gas flow passage provided on the surfaces of the membrane electrode assembly 12, for example, there may occur a nonuniform residual water distribution that is formed because water produced during power generation remains as liquid, and the residual water distribution may also cause a nonuniform power generation distribution. Then, when there occurs a locally excessive amount of residual water in the fuel gas flow passage or in the oxidant gas flow passage, hydrogen supplied to part of region of the anode becomes insufficient or air supplied to part of region of the cathode becomes insufficient, so power generation locally concentrates in another region where supplied hydrogen is not insufficient or supplied air is not insufficient to thereby lead to local degradation of the membrane electrode assembly 12. That is, local power generation concentration due to a water distribution (the above described water content distribution and residual water distribution) within the plane of the membrane electrode assembly leads to local degradation of the membrane electrode assembly.

Then, in the fuel cell system 100 according to the first embodiment, the CPU of the control unit 70 executes power generation concentration suppressing control process for suppressing local power generation concentration due to the above described water distribution in parallel with normal operation control in response to an output power required of the fuel cell stack 10.

Hereinafter, the power generation concentration suppressing control process executed in the fuel cell system 100 will be described with reference to FIG. 3 to FIG. 6.

Figure 3:
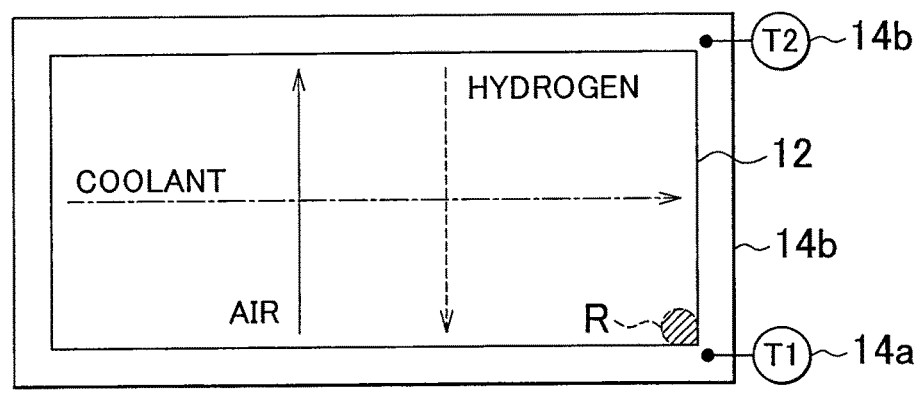
FIG. 3 is a view that illustrates a frame member provided at an outer peripheral portion of the membrane electrode assembly.

FIG. 3 is a view that illustrates a frame member 14 provided at the outer peripheral portion of the membrane electrode assembly 12. Note that through-holes formed in the frame member 14 for flowing hydrogen, anode offgas, air, cathode offgas and coolant in the cell stacking direction in the fuel cell stack 10 are not shown in FIG. 3.

As shown in the drawing, in the frame member 14, a temperature sensor 14a is provided at a portion adjacent to a portion from which air is introduced into the cathode of the membrane electrode assembly 12 at the outlet side of coolant, and is used to detect the temperature T1 of that portion. In addition, in the frame member 14, a temperature sensor 14b is provided at a portion adjacent to a portion from which cathode offgas is exhausted from the cathode of the membrane electrode assembly 12 at the outlet side of coolant, and is used to detect the temperature T2 of that portion. During power generation, within the plane of the membrane electrode assembly 12, the temperature is higher in the downstream region than the upstream region in the flow direction of air because of generated heat. Then, heat generated by the membrane electrode assembly 12 transfers to the frame member 14. Thus, the temperature T2 detected by the temperature sensor 14b is higher than the temperature T1 detected by the temperature sensor 14a.

The portion of the frame member 14, at which the temperature sensor 14a is provided, is also referred to as first portion. In addition, the portion of the frame member 14, at which the temperature sensor 14b is provided, is also referred to as second portion. In addition, the temperature sensor 14a is also referred to as first temperature sensor. In addition, the temperature sensor 14b is also referred to as second temperature sensor.

Figure 4:
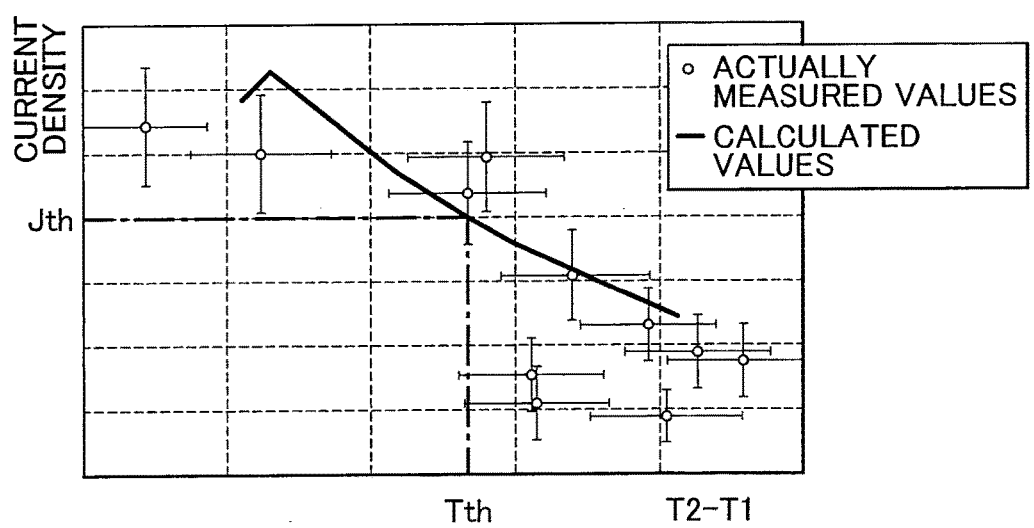
FIG. 4 is a graph that illustrates the correlation between a difference between temperatures that are respectively detected by two temperature sensors provided at the frame member and a current density in a region of the membrane electrode assembly, indicated by hatching in FIG. 3.

FIG. 4 is a graph that illustrates the correlation between a difference (T2−T1) between the temperature T2 and the temperature T1 that are respectively detected by the two temperature sensors 14b and 14a provided for the frame member 14 and the current density in the region R of the membrane electrode assembly 12, indicated by hatching in FIG. 3. Note that the region R of the membrane electrode assembly 12 is a region in which the water content of the electrolyte membrane easily reduces the most within the plane of the membrane electrode assembly 12 (see FIG. 2A). In FIG. 4, for the above correlation, actually measured results are indicated by circle and results calculated through simulation are indicated by solid line.

It has been found from FIG. 4 that the current density in the region R of the membrane electrode assembly 12 reduces as the temperature difference T2−T1 increases. Although not shown in the drawing, it has been found that the current density in a region, other than the region R, of the membrane electrode assembly 12 increases as the temperature difference T2−T1 increases. Then, in the first embodiment, on the basis of the above described findings, when the temperature difference T2−T1 is higher than a threshold Tth at which the current density in the region R of the membrane electrode assembly 12 is a threshold Jth, it is determined that there is local power generation concentration due to a locally insufficient water content within the plane of the electrolyte membrane within the plane of the membrane electrode assembly 12. In addition, the degree of power generation concentration is determined to be larger within the plane of the membrane electrode assembly 12 as the temperature difference T2−T1 increases with respect to the threshold Tth.

Figure 5:
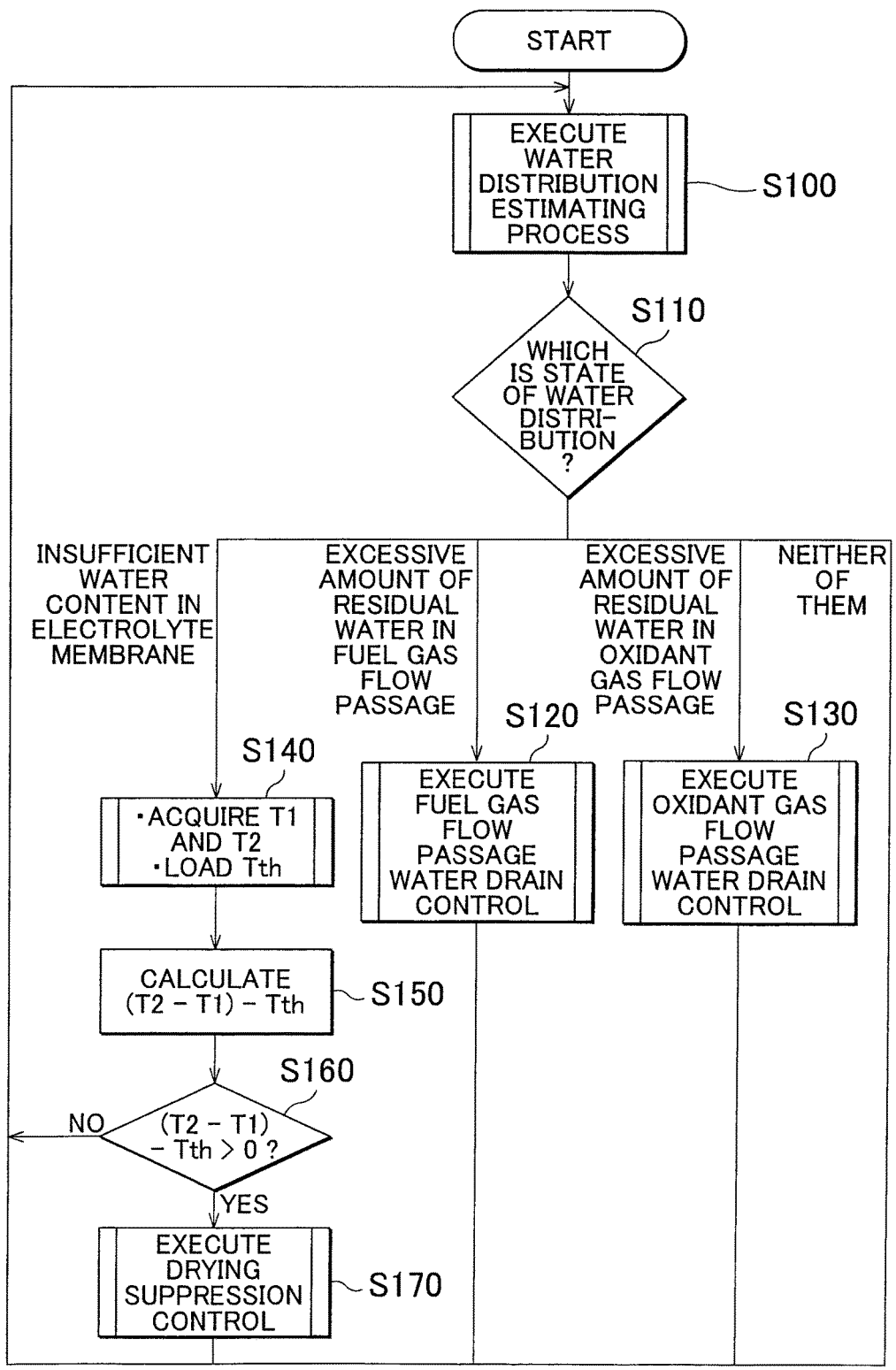
FIG. 5 is a flowchart that shows the flow of power generation concentration suppressing control process executed in the fuel cell system 100 according to the first embodiment.

FIG. 5 is a flowchart that shows the flow of power generation concentration suppressing control process executed in the fuel cell system 100 according to the first embodiment. As the power generation concentration suppressing control process is started, the CPU initially executes water distribution estimating process (step S100). The water distribution estimating process is to estimate a water content distribution within the plane of the electrolyte membrane of the membrane electrode assembly 12, a residual water distribution in the fuel gas flow passage and a residual water distribution in the oxidant gas flow passage.

Here, the outline of the water distribution estimating process according to the first embodiment will be described. Note that the details of the water distribution estimating process described below is described in International Application No. PCT/JP2008/73782.

Initially, the CPU loads the operating condition of the fuel cell stack 10, specifically, the current values detected by the cell monitor 60, the temperature of coolant (hereinafter, also referred to as coolant inlet temperature) detected by the temperature sensor 56, the temperature of coolant (hereinafter, also referred to as coolant outlet temperature) detected by the temperature sensor 55, the flow rate of supplied air (hereinafter, also referred to as air flow rate) detected by the flow rate sensor 31F, the flow rate of supplied hydrogen (hereinafter, also referred to as hydrogen flow rate) in consideration of the anode offgas circulation flow rate detected by the flow rate sensor 27F, the back pressure of cathode offgas (hereinafter, also referred to as air back pressure) detected by the pressure sensor 35P and the pressure in the hydrogen supply line 24 (hereinafter, also referred to as hydrogen pressure) detected by the pressure sensor 24P (first step).

Subsequently, the CPU respectively calculates a cathode inlet dew point and an anode inlet dew point from the coolant inlet temperature and the coolant outlet temperature (second step). Note that the cathode inlet dew point and the anode inlet dew point may be detected using a dew-point hygrometer instead.

After that, the CPU obtains a water transfer rate $V_{H2O,CA\rightarrow AN}$, which is the transfer rate of water that transfers from the cathode to the anode via the electrolyte membrane within the plane of the membrane electrode assembly 12 (third step). The water transfer rate $V_{H2O,CA\rightarrow AN}$ is calculated using the following mathematical expression (1).

$$V_{H2O,CA\rightarrow AN}=D_{H2O}\times(P_{H2O,CA}-P_{H2O,AN}) \quad (1)$$

Here, $P_{H2O,CA}$ is a water vapor partial pressure at the cathode of the membrane electrode assembly 12, and is calculated using the cathode inlet dew point. In addition, $P_{H2O,AN}$ is a water vapor partial pressure at the anode of the membrane electrode assembly 12, and is calculated using the anode inlet dew point. In addition, $D_{H2O}$ is a water diffusion coefficient in the electrolyte membrane of the membrane electrode assembly 12.

Then, the CPU calculates the current density at each of divided in-plane regions of the membrane electrode assembly 12 from the water transfer rate, the cathode inlet dew point, the anode inlet dew point, the coolant outlet temperature, the air back pressure, the hydrogen pressure, the air flow rate, the hydrogen flow rate and the current value using a function or a map (fourth step). In addition, the CPU calculates a current distribution and relative humidity distribution within the plane of the membrane electrode assembly 12 from the cathode inlet dew point, the anode inlet dew point, the coolant outlet temperature, the air back pressure, the hydrogen pressure, the air flow rate, the hydrogen flow rate and the water transfer rate using a function or a map (fourth step).

Subsequently, for each of the anode and cathode of the membrane electrode assembly 12, the CPU calculates a supersaturation degree $\sigma_1$ (degree to which the relative humidity exceeds 100%) and an unsaturation degree $\sigma_2$ (degree to which the relative humidity falls below 100%) from the above described relative humidity distribution and then calculates a liquid water production rate $V_{vap\rightarrow liq}$ that is the rate at which vapor changes to water and a liquid water evaporation rate $V_{liq\rightarrow vap}$ that is the rate at which water changes to vapor respectively using the following mathematical expressions (2) and (3) (fifth step). This is because, in consideration of a change of the phase of water (gaseous phase, liquid phase) in the fuel gas flow passage and the oxidant gas flow passage, the liquid water production rate $V_{vap\rightarrow liq}$ and the liquid water evaporation rate $V_{liq\rightarrow vap}$ in each of the fuel gas flow passage and the oxidant gas flow passage are calculated.

$$V_{vap\rightarrow liq}=k_1\times\sigma_1 \quad (2)$$

$$V_{liq\rightarrow vap}=k_2\times\sigma_2 \quad (3)$$

Here, coefficients $k_1$ and $k_2$ are factors based on temperature and water repellency, and are derived from the physical properties of the reaction gas flow passages. The coefficients $k_1$ and $k_2$ are mapped in advance through an experiment.

After that, the CPU calculates a water transfer rate V_liq in the fuel gas flow passage and the oxidant gas flow passage using the following mathematical expression (4) for each of the anode and cathode of the membrane electrode assembly 12 (sixth step). Water is blown off and exhausted from the inside of the plane of the membrane electrode assembly 12 by the flow of gas in the fuel gas flow passage and the oxidant gas flow passage, so the water transfer rate V_liq is calculated in each of the fuel gas flow passage and the oxidant gas flow passage in consideration of the above fact.

$$V\_liq=k_3\times V\_gas \quad (4)$$

Here, the water transfer rate V_liq is the transfer rate of water that is blown off by gas. In addition, V_gas is a vapor flow rate in the fuel gas flow passage or in the oxidant gas flow passage, and is calculated from a map associated with a state quantity, such as the flow rate of supplied gas and a vapor partial pressure. The coefficient $k_3$ is a factor based on temperature and water repellency, and is derived from the physical property of the fuel gas flow passage or oxidant gas flow passage. $k_3$ is mapped in advance by an experiment.

Through the above described fourth step to sixth step, a residual water distribution in the fuel gas flow passage and a residual water distribution in the oxidant gas flow passage may be estimated. In addition, from the above described fourth step, a water content distribution within the plane of the electrolyte membrane of the membrane electrode assembly 12 may be estimated.

After the water distribution estimating process (step S100), the CPU determines the state of water distribution (step S110). That is, the CPU determines whether the residual water in the fuel gas flow passage is excessive to a degree such that local power generation concentration occurs (excessive amount of residual water in the fuel gas flow passage), the residual water in the oxidant gas flow passage is excessive to a degree such that local power generation concentration occurs (excessive amount of residual water in the oxidant gas flow passage), the water content within the plane of the electrolyte membrane of the membrane electrode assembly 12 is locally insufficient (insufficient water content of the electrolyte membrane), or not. Note that the determination reference for an excessive amount of residual water in the fuel gas flow passage and the determination reference for an excessive amount of residual water in the oxidant gas flow passage are, for example, empirically defined.

Then, in step S110, when the CPU determines that the state of a water distribution is not an excessive amount of residual water in the fuel gas flow passage, an excessive amount of residual water in the oxidant gas flow passage or an insufficient water content in the electrolyte membrane, the CPU recognizes that there is no local power generation concentration due to a water distribution within the plane of the membrane electrode assembly 12, and returns the process to step S100.

In addition, in step S110, when the CPU determines that the state of a water distribution is an excessive amount of residual water in the fuel gas flow passage, the CPU executes fuel gas flow passage water drain control (step S120). In the first embodiment, in the fuel gas flow passage water drain control, the rotational speed of the hydrogen circulation pump 27 is increased for a predetermined period of time. By so doing, liquid water locally remaining in the fuel gas flow passage is drained outside the fuel cell stack 10 to thereby make it possible to eliminate local power generation concentration due to the locally excessive amount of residual water in the fuel gas flow passage. Note that, after step S120, the CPU returns the process to step S100.

In addition, in step S110, when the CPU determines that the state of a water distribution is an excessive amount of residual water in the oxidant gas flow passage, the CPU executes oxidant gas flow passage water drain control (step S130). In the first embodiment, in the oxidant gas flow passage water drain control, for a predetermined period of time, the rotational speed of the air compressor 31 is increased, and the opening degree of the pressure regulating valve 36 is increased to decrease the back pressure of cathode offgas. By so doing, liquid water locally remaining in the oxidant gas flow passage is drained outside the fuel cell stack 10 to thereby make it possible to eliminate local power generation concentration due to the locally excessive amount of residual water in the oxidant gas flow passage. Note that, after step S130, the CPU returns the process to step S100.

In addition, in step S110, when the CPU determines that the state of a water distribution is an insufficient water content in the electrolyte membrane, the CPU acquires the temperature T1 detected by the temperature sensor 14a and the temperature T2 detected by the temperature sensor 14b, and loads the threshold Tth from the ROM (step S140) to calculate (T2−T1)−Tth (step S150). Then, the CPU determines whether (T2−T1)−Tth is larger than 0 (step S160). When (T2−T1)−Tth is smaller than or equal to 0 (NO in step S160), the CPU recognizes that there is no local power generation concentration due to a locally insufficient water content within the plane of the electrolyte membrane of the membrane electrode assembly 12, and returns the process to step S100. On the other hand, when (T2−T1)−Tth is larger than 0 (YES in step S160), the CPU recognizes that there is the above power generation concentration within the plane of the membrane electrode assembly 12, and executes drying suppression control (step S170). In the first embodiment, in the drying suppression control, the opening degree of the pressure regulating valve 36 is decreased to increase the back pressure of cathode offgas during a predetermined period of time. By so doing, evaporation of water from the electrolyte membrane of the membrane electrode assembly 12 is suppressed to thereby make it possible to eliminate local power generation concentration due to a locally insufficient water content in the electrolyte membrane. In addition, in the drying suppression control, the rotational speed of the air compressor 31 may be decreased to reduce the flow rate of air supplied to the fuel cell stack 10 or the rotational speed of the hydrogen circulation pump 27 may be increased to increase the flow rate of hydrogen supplied to the fuel cell stack 10. Note that, after step S170, the CPU returns the process to step S100.

Figure 6:
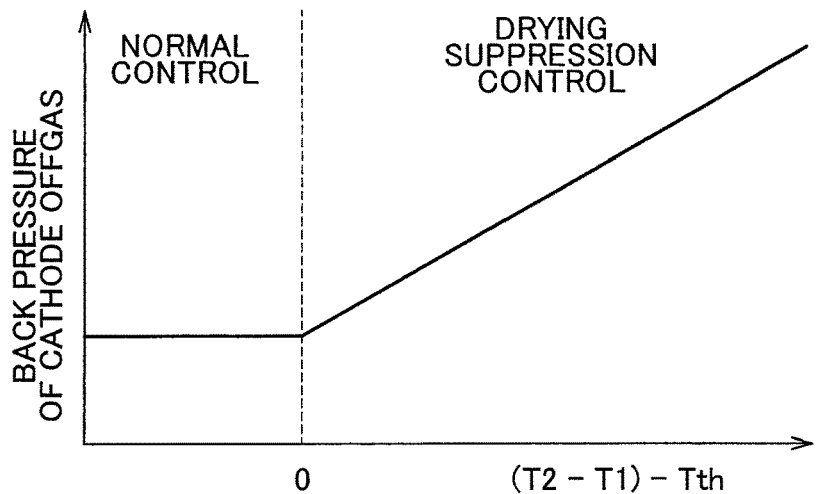
FIG. 6 is a graph that shows a method of determining the back pressure of cathode offgas in drying suppression control executed in the first embodiment.

FIG. 6 is a graph that illustrates a method of determining the back pressure of cathode offgas in drying suppression control. As described with reference to FIG. 4 above, as the temperature difference T2−T1 increases with respect to the threshold Tth, the degree of local power generation concentration due to a locally insufficient water content within the plane of the electrolyte membrane may be determined to be larger. Then, in the first embodiment, as shown in FIG. 6, as the temperature difference T2−T1 increases with respect to the threshold Tth, the opening degree of the pressure regulating valve 36 is decreased to increase the back pressure of cathode offgas. By so doing, it is possible to efficiently and quickly eliminate the power generation concentration. As a result, energy required in the control is suppressed, and it is possible to suppress a decrease in energy efficiency in the fuel cell system 100.

With the thus described fuel cell system 100 according to the first embodiment, in the fuel cell stack 10 (polymer electrolyte fuel cell), it is possible to suppress local degradation of each membrane electrode assembly 12 caused by local power generation concentration within the plane of the membrane electrode assembly 12 due to a water distribution.

In addition, in the fuel cell system 100 according to the first embodiment, as shown in FIG. 3, the temperature sensors 14a and 14b are provided not within the plane of the membrane electrode assembly 12 but on the frame member 14, so, in comparison with the case where the temperature sensors 14a and 14b are provided within the plane of the membrane electrode assembly 12, it is possible to prevent a complex configuration of the fuel cell stack 10, and it is possible to avoid interference with gas flow on the surfaces of the membrane electrode assembly 12.

In addition, the temperature sensor 14a is provided at a portion adjacent to a portion from which air is introduced into the cathode of the membrane electrode assembly 12, that is, a portion at which the temperature easily decreases, in the frame member 14, and the temperature sensor 14b is provided at a portion adjacent to a portion from which cathode offgas is exhausted from the cathode of the membrane electrode assembly 12, that is, a portion at which the temperature easily increases, in the frame member 14, so the difference between the temperature detected by the temperature sensor 14a and the temperature detected by the temperature sensor 14b is relatively large. Thus, it is possible to reduce adverse influence of detection errors of the temperature sensors 14a and 14b on the determination.

Next, a second embodiment will be described. The configuration of a fuel cell system according to the second embodiment is the same as the configuration of the fuel cell system 100 according to the first embodiment except that the temperature sensors 14a and 14b are not provided for the frame member 14 shown in FIG. 3. Then, in the fuel cell system according to the second embodiment, power generation concentration suppressing control process is different from the power generation concentration suppressing control process in the first embodiment. Hereinafter, the power generation concentration suppressing control process executed in the fuel cell system according to the second embodiment will be described.

Figure 7:
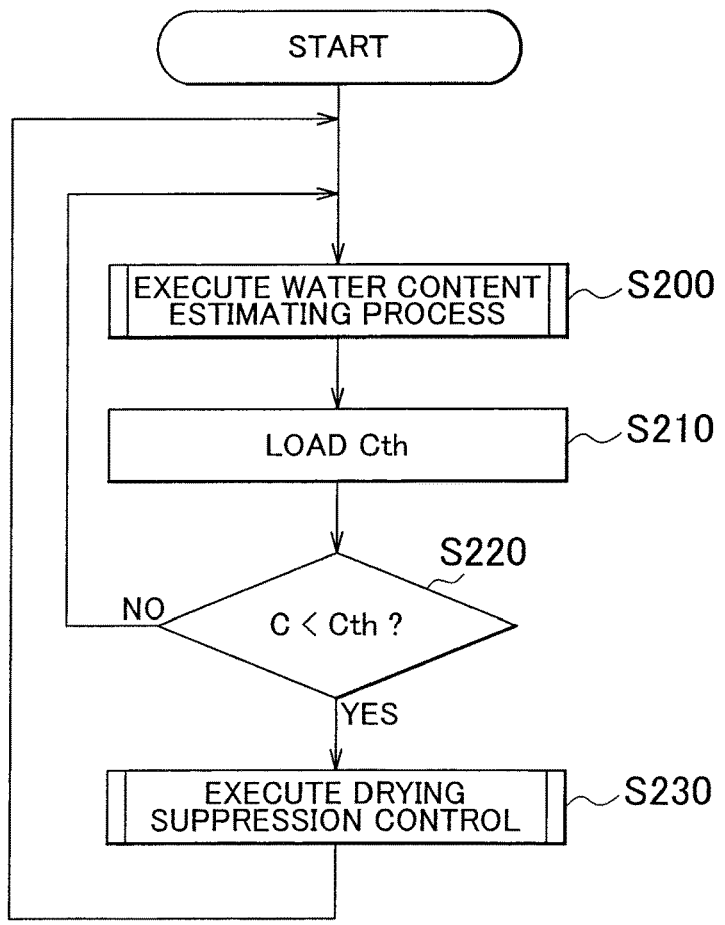
FIG. 7 is a flowchart that shows the flow of power generation concentration suppressing control process executed in a fuel cell system according to a second embodiment.

FIG. 7 is a flowchart that shows the flow of power generation concentration suppressing control process executed in the fuel cell system according to the second embodiment. This process is executed by the CPU of the control unit 70 in parallel with normal operation control in response to an output power required of the fuel cell stack 10.

When the power generation concentration suppressing control process is started, the CPU initially loads the operating condition of the fuel cell stack 10, and executes water content estimating process (step S200). The water content estimating process is to estimate the water content of the electrolyte membrane at a predetermined portion of the membrane electrode assembly 12. In the second embodiment, the water content in the region R of the membrane electrode assembly 12 shown in FIG. 3 is estimated. The region R, here means a region in which the water content most easily reduces within the plane of the electrolyte membrane. Note that the water content estimating process is part of the water distribution estimating process according to the above described first embodiment, so the detailed description of the water content estimating process is omitted here.

Here, the correlation between the water content of the electrolyte membrane of the membrane electrode assembly 12 and local power generation concentration within the plane of the membrane electrode assembly 12 will be described.

Figure 8:
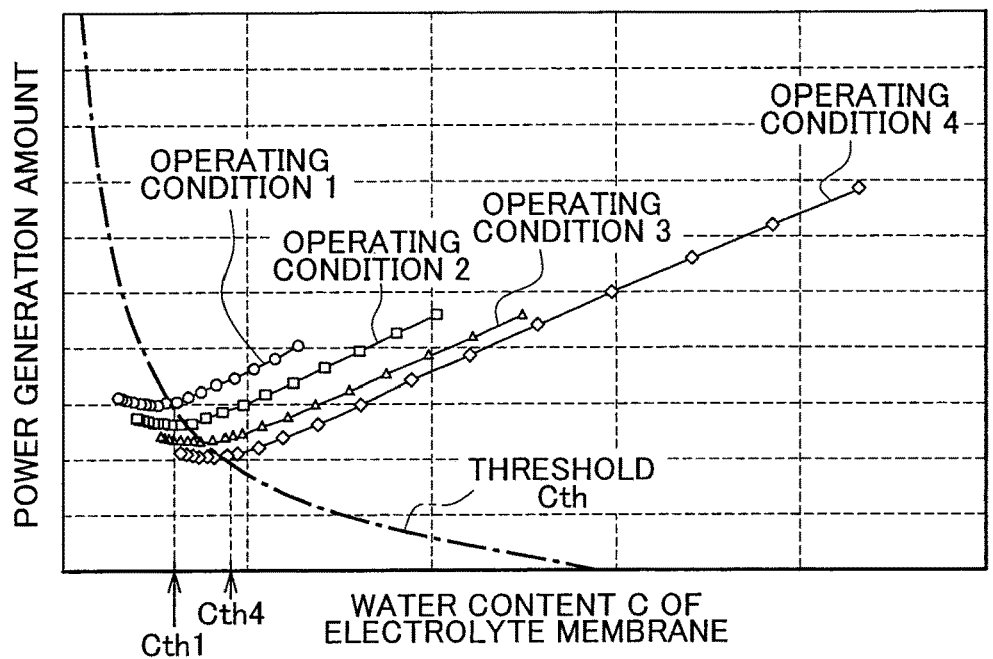
FIG. 8 is a graph that illustrates the correlation between a water content and power generation amount of an electrolyte membrane under various operating conditions of a fuel cell stack according to the second embodiment.

FIG. 8 is a graph that illustrates the correlation between the water content and power generation amount of the electrolyte membrane under various operating conditions of the fuel cell stack 10. FIG. 8 shows the correlation between the water content and power generation amount of the electrolyte membrane under operating conditions 1 to 4 in which the operating temperatures of the fuel cell stack 10 are varied.

As shown in the graph, in each operating condition, there is a range of water content in which the power generation amount increases with an increase in the water content of the electrolyte membrane and a range of water content in which the power generation amount reduces with an increase in the water content of the electrolyte membrane. Then, the inventors found that, local power generation concentration due to a locally insufficient water content within the plane of the electrolyte membrane does not occur within the plane of the membrane electrode assembly 12 in the range of water content in which the power generation amount increases with an increase in the water content of the electrolyte membrane, and the power generation concentration occurs within the plane of the membrane electrode assembly 12 in the range of water content in which the power generation amount reduces with an increase in the water content of the electrolyte membrane. In addition, the inventors found that, in the range of water content in which the power generation amount reduces with an increase in the water content of the electrolyte membrane, the degree of the power generation concentration increases as the water content of the electrolyte membrane reduces. Then, in the second embodiment, as indicated by the alternate long and short dashes line in the graph, for each operating condition of the fuel cell stack 10, a threshold Cth for the water content C of the electrolyte membrane is defined at the boundary between the range of water content in which the power generation amount increases with an increase in the water content of the electrolyte membrane and the range of water content in which the power generation amount reduces with an increase in the water content of the electrolyte membrane, and is used in the power generation concentration suppressing control process as will be described below. For example, for the operating condition 1 ("O"), Cth1 is defined as the threshold Cth, and, for the operating condition 4 ("◇"), Cth4 that is larger than Cth1 is defined as the threshold Cth. Each threshold Cth is mapped.

Referring back to FIG. 7, after the water content estimating process (step S200), the CPU loads the threshold Cth corresponding to the operating condition of the fuel cell stack 10 from the ROM (step S210), and then determines whether the water content C is smaller than the threshold Cth (step S220). Then, when the water content C is larger than or equal to the threshold Cth (NO in step S220), the CPU recognizes that there is no local power generation concentration due to a locally insufficient water content within the plane of the electrolyte membrane within the plane of the membrane electrode assembly 12, and returns the process to step S200. On the other hand, when the water content C is smaller than the threshold Cth (YES in step S220), the CPU recognizes that there is the power generation concentration within the plane of the membrane electrode assembly 12, and executes drying suppression control (step S230). In the second embodiment, in the drying suppression control, the opening degree of the pressure regulating valve 36 is decreased to increase the back pressure of cathode offgas for a predetermined period of time. By so doing, evaporation of water from the electrolyte membrane of the membrane electrode assembly 12 is suppressed to thereby make it possible to eliminate local power generation concentration due to a locally insufficient water content in the electrolyte membrane. In addition, in the drying suppression control, the rotational speed of the air compressor 31 may be decreased to reduce the flow rate of air supplied to the fuel cell stack 10 or the rotational speed of the hydrogen circulation pump 27 may be increased to increase the flow rate of hydrogen supplied to the fuel cell stack 10. Note that, after step S230, the CPU returns the process to step S200.

Figure 9:
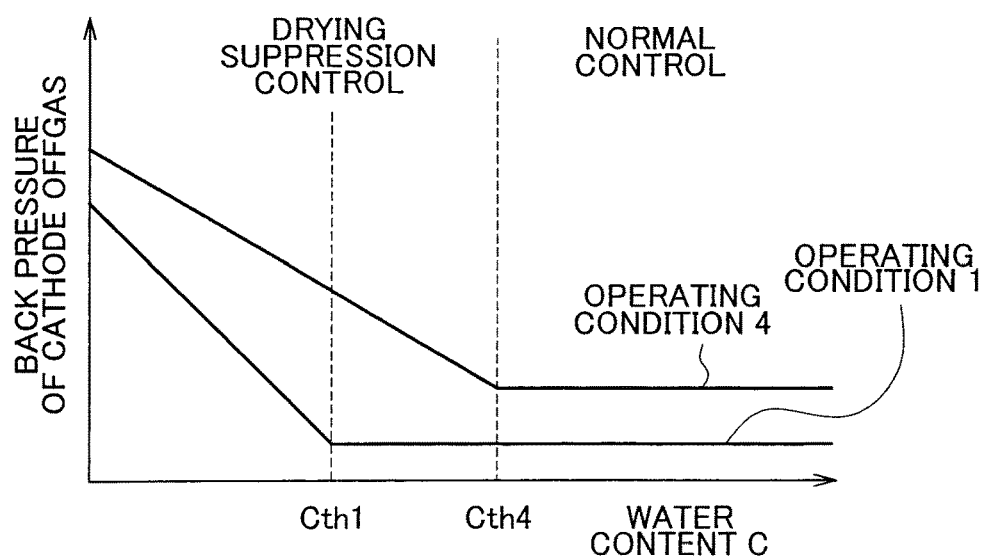
FIG. 9 is a graph that illustrates a method of determining the back pressure of cathode offgas in drying suppression control executed in the second embodiment.

FIG. 9 is a graph that illustrates a method of determining the back pressure of cathode offgas in drying suppression control. As described with reference to FIG. 8 above, in the range of water content in which the power generation amount reduces with an increase in the water content of the electrolyte membrane, the degree of the power generation concentration may be determined to be larger as the water content of the electrolyte membrane reduces. Then, in the second embodiment, under each operating condition of the fuel cell stack 10, as the water content C of the electrolyte membrane reduces with respect to the threshold Cth, the opening degree of the pressure regulating valve 36 is decreased to increase the back pressure of cathode offgas. For example, as shown in FIG. 9, in the case of the operating condition 1, as the water content C of the electrolyte membrane reduces with respect to the threshold Cth1, the opening degree of the pressure regulating valve 36 is decreased; in the case of the operating condition 4, as the water content C of the electrolyte membrane reduces with respect to the threshold Cth4, the opening degree of the pressure regulating valve 36 is decreased to increase the back pressure of cathode offgas. By so doing, it is possible to effectively and quickly eliminate the power generation concentration. As a result, energy required in the control is suppressed, and it is possible to suppress a decrease in energy efficiency in the fuel cell system.

With the thus described fuel cell system according to the second embodiment as well, in the fuel cell stack 10 (polymer electrolyte fuel cell), it is possible to suppress local degradation of each membrane electrode assembly 12 caused by local power generation concentration within the plane of the membrane electrode assembly 12 due to a water distribution.

In addition, in the second embodiment, in the water content estimating process (FIG. 7, step S200), the water content at the portion at which the water content easily reduces within the plane of the electrolyte membrane is estimated, so it is possible to determine whether there is the power generation concentration with high sensitivity. This is because, at the portion at which the water content easily reduces within the plane of the electrolyte membrane, the water content of the electrolyte membrane easily varies in response to the operating condition of the fuel cell stack 10.

Next, a third embodiment will be described. The configuration of a fuel cell system according to the third embodiment is the same as the configuration of the fuel cell system according to the second embodiment. However, in the fuel cell system according to the third embodiment, power generation concentration suppressing control process is different from the power generation concentration suppressing control process in the second embodiment. Hereinafter, the power generation concentration suppressing control process executed in the fuel cell system according to the third embodiment will be described.

FIG. 10 is a flowchart that shows the flow of power generation concentration suppressing control process executed in the fuel cell system according to the third embodiment. This process is executed by the CPU of the control unit 70 in parallel with normal operation control in response to an output power required of the fuel cell stack 10.

When the power generation concentration suppressing control process is started, the CPU initially loads the operating condition of the fuel cell stack 10, and executes anode-cathode water transfer amount distribution estimating process (step S300). The anode-cathode water transfer amount distribution estimating process is to estimate a distribution of water content that transfers between the cathode and the anode across the electrolyte membrane within the plane of the membrane electrode assembly 12 (anode-cathode water transfer amount). In the present embodiment, a two-dimensional distribution of anode-cathode water transfer amount is estimated along the flow direction of hydrogen and the flow direction of air (see FIG. 3). Note that the anode-cathode water transfer amount distribution estimating process may be executed as in the case of the water distribution estimating process in the power generation concentration suppressing control process according to the above described first embodiment, and the detailed description of the anode-cathode water transfer amount distribution estimating process is omitted here.

Here, the correlation between a distribution of anode-cathode water transfer amount within the plane of the membrane electrode assembly 12 and local power generation concentration will be described.

Figure 11A:
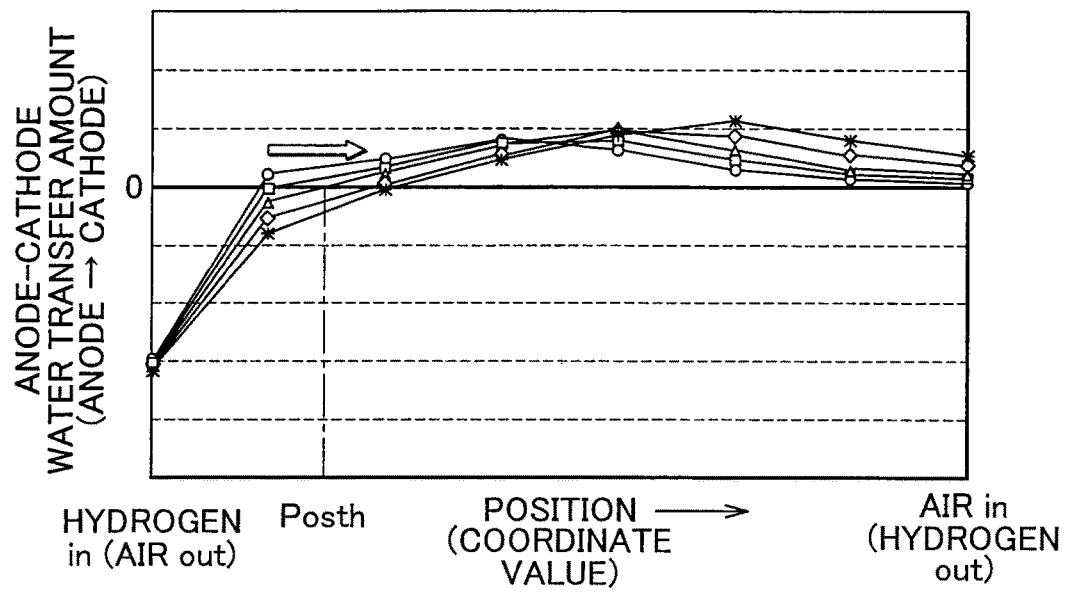
FIG. 11A and FIG. 11B are graphs that illustrate the correlation between an anode-cathode water transfer amount distribution within the plane of a membrane electrode assembly and local power generation concentration according to the third embodiment.
Figure 11B:
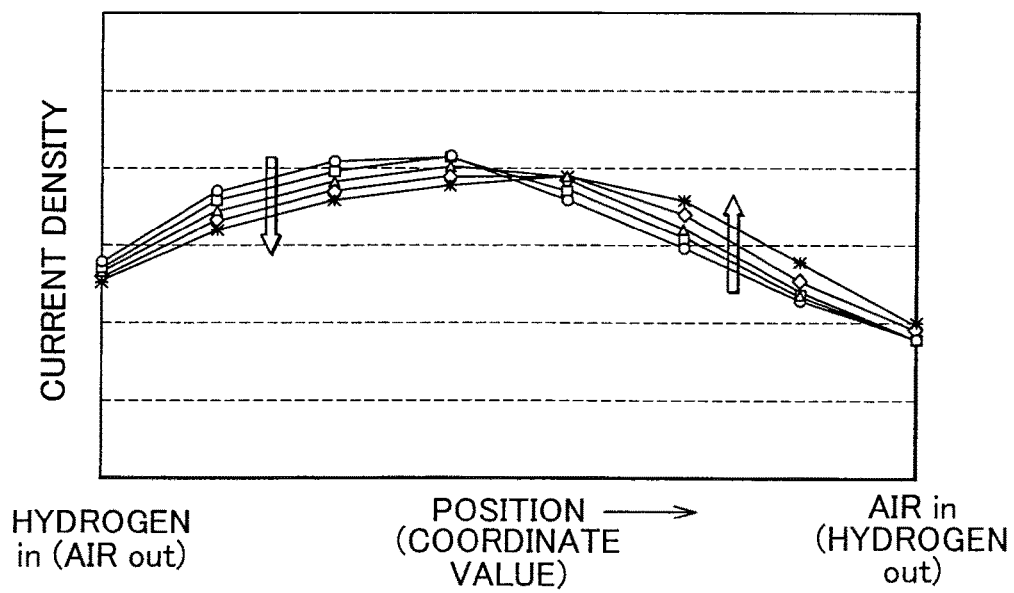

FIG. 11A and FIG. 11B are graphs that illustrate the correlation between an anode-cathode water transfer amount distribution within the plane of the membrane electrode assembly 12 and local power generation concentration. FIG. 11A shows a distribution of water content that transfers from the anode to the cathode (anode-cathode water transfer amount distribution) within the plane of the membrane electrode assembly 12 when the back pressure of cathode offgas is varied. In addition, FIG. 11B shows a distribution of current density when the back pressure of cathode offgas is varied. Note that, in FIG. 11A and FIG. 11B, the back pressure of cathode offgas increases in order of "O", "□", "Δ", "◊" and "*" (the back pressure of cathode offgas: "O"<"□"<"Δ"<"◊"<"*").

It has been found from FIG. 11A that, as the back pressure of cathode offgas increases, a position at which the anode-cathode water transfer amount is 0 approaches from the outlet side of cathode offgas (hydrogen in, air out) to the inlet side of air (air in, hydrogen out), that is, a coordinate value Pos that indicates the distance between a portion from which cathode offgas is exhausted and a portion at which the anode-cathode water transfer amount is 0 increases. In addition, it has also been found from FIG. 11B that, as the back pressure of cathode offgas increases, the current density at the outlet side of cathode offgas reduces, the current density at the inlet side of air increases, and a current density distribution is uniformized Then, the inventors have found from FIG. 11A and FIG. 11B that, as the coordinate value Pos that indicates the distance between a portion from which cathode offgas is exhausted and a portion at which the anode-cathode water transfer amount is 0 reduces, there occurs power generation concentration within the plane of the membrane electrode assembly 12; whereas, as the coordinate value Pos increases, there occurs no local power generation concentration within the plane of the membrane electrode assembly 12. Then, in the third embodiment, on the basis of the above described findings, a threshold Posth is defined for the coordinate value Pos, and, when the coordinate value Pos is smaller than the threshold Posth, it is determined that there is local power generation concentration due to a locally insufficient water content within the plane of the electrolyte membrane within the plane of the membrane electrode assembly 12. In addition, as the coordinate value Pos reduces with respect to the threshold Posth, the degree of the power generation concentration is determined to be larger within the plane of the membrane electrode assembly 12.

Referring back to FIG. 10, after the anode-cathode water transfer amount distribution estimating process (step S300), the CPU loads the threshold Posth from the ROM (step S310), and then determines whether the coordinate value Pos is smaller than the threshold Posth (step S320). Then, when the coordinate value Pos is larger than or equal to the threshold Posth (NO in step S320), the CPU recognizes that there is no local power generation concentration due to a locally insufficient water content within the plane of the electrolyte membrane within the plane of the membrane electrode assembly 12, and returns the process to step S300. On the other hand, when the coordinate value Pos is smaller than the threshold Posth (YES in step S320), the CPU recognizes that there is the power generation concentration within the plane of the membrane electrode assembly 12, and executes drying suppression control (step S330). In the third embodiment, in the drying suppression control, the opening degree of the pressure regulating valve 36 is decreased to increase the back pressure of cathode offgas for a predetermined period of time. By so doing, evaporation of water from the electrolyte membrane of the membrane electrode assembly 12 is suppressed to thereby make it possible to eliminate local power generation concentration due to a locally insufficient water content in the electrolyte membrane. In addition, in the drying suppression control, the rotational speed of the air compressor 31 may be decreased to reduce the flow rate of air supplied to the fuel cell stack 10 or the rotational speed of the hydrogen circulation pump 27 may be increased to increase the flow rate of hydrogen supplied to the fuel cell stack 10. Note that, after step S330, the CPU returns the process to step S300.

Figure 12:
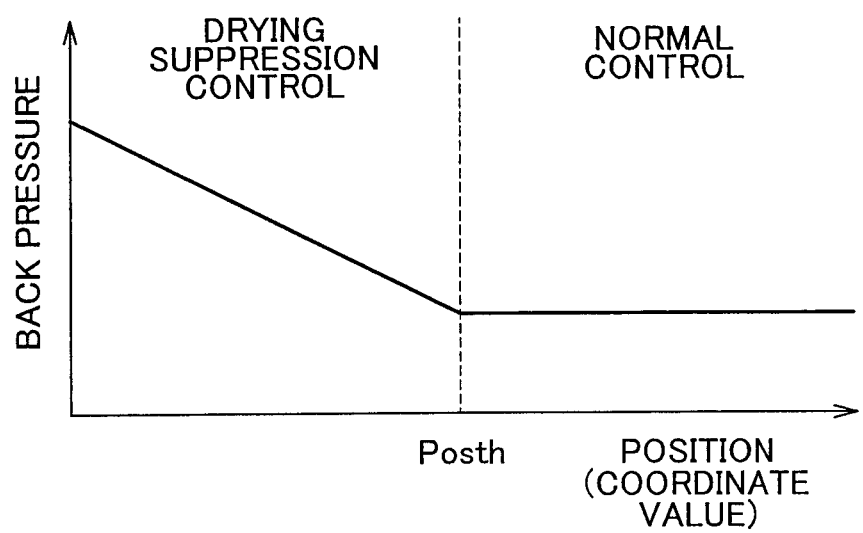
FIG. 12 is a graph that illustrates a method of determining the back pressure of cathode offgas in drying suppression control executed in the third embodiment.

FIG. 12 is a graph that illustrates a method of determining the back pressure of cathode offgas in drying suppression control. As described with reference to FIG. 11A and FIG. 11B above, as the coordinate value Pos that indicates the distance between a portion from which cathode offgas is exhausted and a portion at which the anode-cathode water transfer amount is 0 reduces with respect to the threshold Posth, the degree of the power generation concentration may be determined to be larger within the plane of the membrane electrode assembly 12. Then, in the third embodiment, as shown in FIG. 12, as the coordinate value Pos reduces with respect to the threshold Posth, the opening degree of the pressure regulating valve 36 is decreased to increase the back pressure of cathode offgas. By so doing, it is possible to efficiently and quickly eliminate the power generation concentration. As a result, energy required in the control is suppressed, and it is possible to suppress a decrease in energy efficiency in the fuel cell system.

With the thus described fuel cell system according to the third embodiment as well, in the fuel cell stack 10 (polymer electrolyte fuel cell), it is possible to suppress local degradation of each membrane electrode assembly 12 caused by local power generation concentration within the plane of the membrane electrode assembly 12 due to a water distribution.

Next, a fourth embodiment will be described. The configuration of a fuel cell system according to the fourth embodiment is the same as the configuration of the fuel cell system according to the second embodiment. However, in the fuel cell system according to the fourth embodiment, power generation concentration suppressing control process is different from the power generation concentration suppressing control process in the second embodiment. Hereinafter, the power generation concentration suppressing control process executed in the fuel cell system according to the fourth embodiment will be described.

Figure 13:
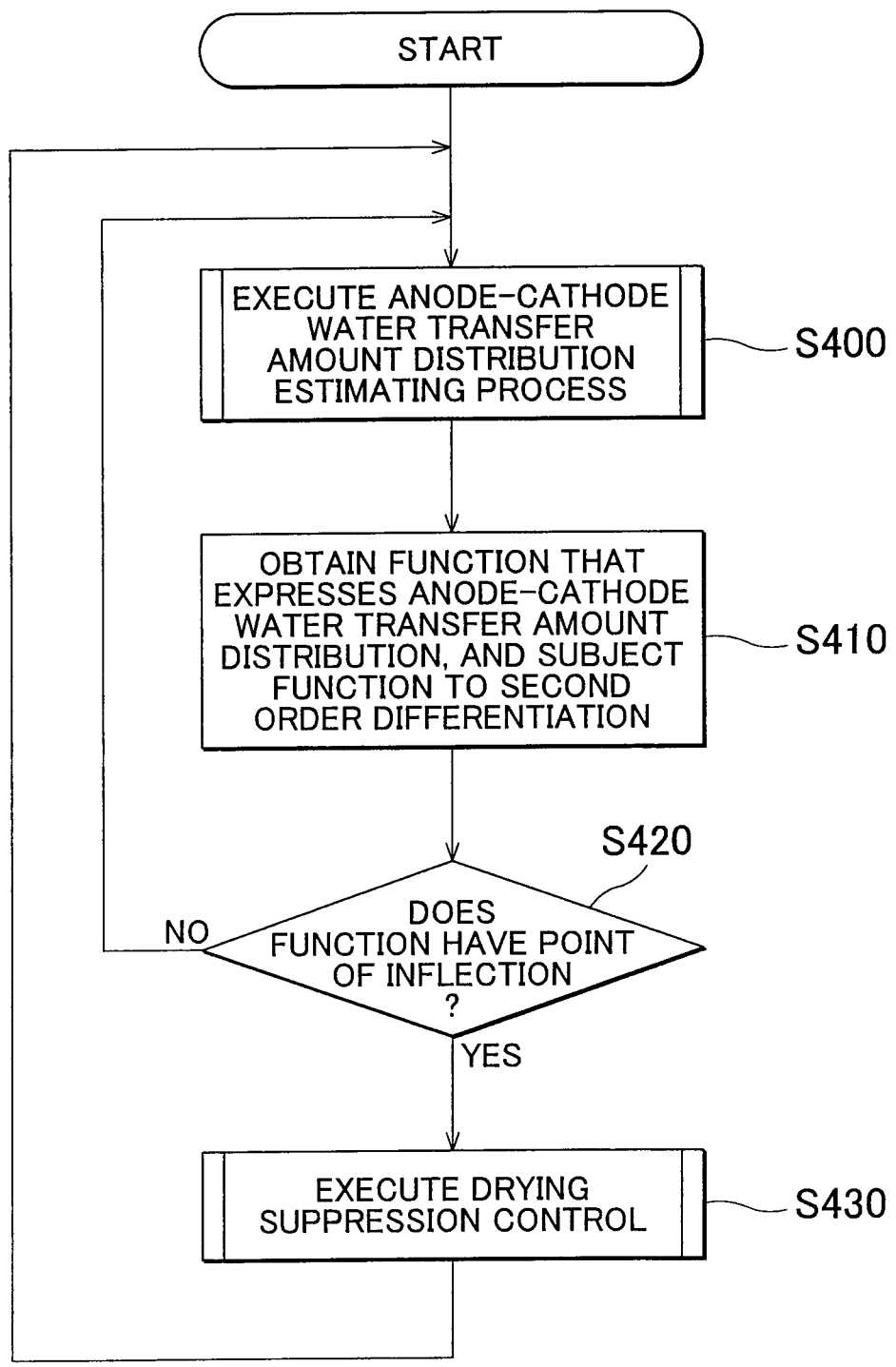
FIG. 13 is a flowchart that shows the flow of power generation concentration suppressing control process executed in a fuel cell system according to a fourth embodiment.

FIG. 13 is a flowchart that shows the flow of power generation concentration suppressing control process executed in the fuel cell system according to the fourth embodiment. This process is executed by the CPU of the control unit 70 in parallel with normal operation control in response to an output power required of the fuel cell stack 10.

When the power generation concentration suppressing control process is started, the CPU initially loads the operating condition of the fuel cell stack 10, and executes anode-cathode water transfer amount distribution estimating process (step S400). This anode-cathode water transfer amount distribution estimating process is the same as the anode-cathode water transfer amount distribution estimating process in the power generation concentration suppressing control process according to the third embodiment.

Here, the correlation between a distribution of anode-cathode water transfer amount within the plane of the membrane electrode assembly 12 and local power generation concentration will be described.

Figure 14A:
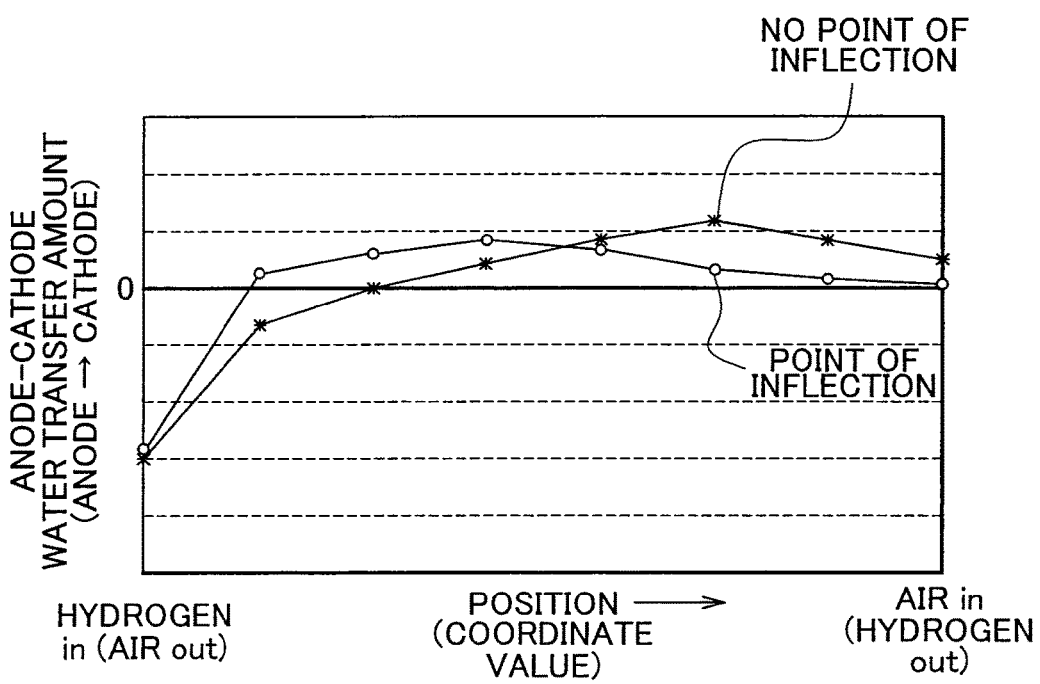
FIG. 14A and FIG. 14B are graphs that illustrate the correlation between an anode-cathode water transfer amount distribution within the plane of a membrane electrode assembly and local power generation concentration according to the fourth embodiment.
Figure 14B:
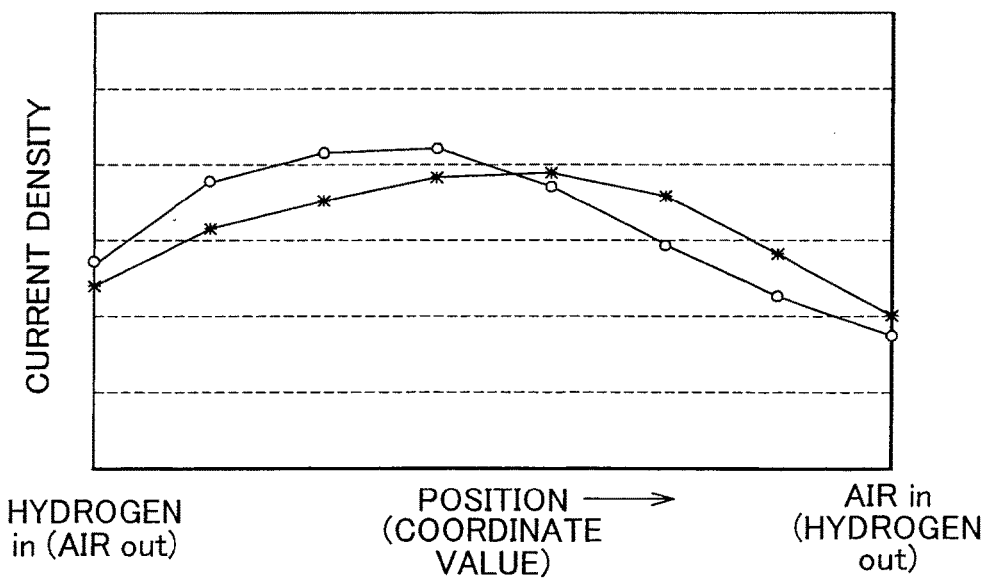

FIG. 14A and FIG. 14B are graphs that illustrate the correlation between an anode-cathode water transfer amount distribution within the plane of the membrane electrode assembly 12 and local power generation concentration. FIG. 14A shows a distribution of water content that transfers from the anode to the cathode (anode-cathode water transfer amount distribution) within the plane of the membrane electrode assembly 12 when the back pressure of cathode offgas is varied. In addition, FIG. 14B shows a distribution of current density when the back pressure of cathode offgas is varied. Note that, in FIG. 14A and FIG. 14B, the back pressure of cathode offgas is higher in the distribution indicated by "*" than in the distribution indicated by "O".

It has been found from FIG. 14A that, when the back pressure of cathode offgas is relatively low, the function that expresses an anode-cathode water transfer amount distribution has a point of inflection; whereas, when the back pressure of cathode offgas is relatively high, the function that expresses an anode-cathode water transfer amount distribution has no point of inflection. In addition, it has also been found from FIG. 14B (FIG. 11B) that, as the back pressure of cathode offgas increases, the current density at the outlet side of cathode offgas reduces, the current density at the inlet side of air increases, and a current density distribution is uniformized Then, the inventors have found from FIG. 14A and FIG. 14B that, when the function that expresses an anode-cathode water transfer amount distribution has a point of inflection, there occurs power generation concentration within the plane of the membrane electrode assembly 12; whereas, when the function that expresses an anode-cathode water transfer amount distribution has no point of inflection, there occurs no power generation concentration within the plane of the membrane electrode assembly 12. Then, in the fourth embodiment, on the basis of the above described findings, when the function that expresses an anode-cathode water transfer amount distribution has a point of inflection, it is determined that there is local power generation concentration due to a locally insufficient water content within the plane of the electrolyte membrane within the plane of the membrane electrode assembly 12.

Referring back to FIG. 13, after the anode-cathode water transfer amount distribution estimating process (step S400), the CPU obtains a function that expresses an anode-cathode water transfer amount distribution, subjects the function to second order differentiation (step S410), and then determines whether the function that expresses an anode-cathode water transfer amount distribution has a point of inflection (step S420). When the function that expresses an anode-cathode water transfer amount distribution has no point of inflection (NO in step S420), the CPU recognizes that there is no local power generation concentration due to a locally insufficient water content within the plane of the electrolyte membrane within the plane of the membrane electrode assembly 12, and returns the process to step S400. On the other hand, when the function that expresses an anode-cathode water transfer amount distribution has a point of inflection (YES in step S420), the CPU recognizes that there is the above power generation concentration within the plane of the membrane electrode assembly 12, and executes drying suppression control (step S430). In the fourth embodiment, in the drying suppression control, the opening degree of the pressure regulating valve 36 is decreased to increase the back pressure of cathode offgas for a predetermined period of time. By so doing, evaporation of water from the electrolyte membrane of the membrane electrode assembly 12 is suppressed to thereby make it possible to eliminate local power generation concentration due to a locally insufficient water content in the electrolyte membrane. In addition, in the drying suppression control, the rotational speed of the air compressor 31 may be decreased to reduce the flow rate of air supplied to the fuel cell stack 10 or the rotational speed of the hydrogen circulation pump 27 may be increased to increase the flow rate of hydrogen supplied to the fuel cell stack 10. Note that, after step S430, the CPU returns the process to step S400.

With the thus described fuel cell system according to the fourth embodiment as well, in the fuel cell stack 10 (polymer electrolyte fuel cell), it is possible to suppress local degradation of each membrane electrode assembly 12 caused by local power generation concentration within the plane of the membrane electrode assembly 12 due to a water distribution.

Next, a fifth embodiment will be described. The configuration of a fuel cell system according to the fifth embodiment is the same as the configuration of the fuel cell system according to the second embodiment. However, in the fuel cell system according to the fifth embodiment, power generation concentration suppressing control process is different from the power generation concentration suppressing control process in the second embodiment. Hereinafter, the power generation concentration suppressing control process executed in the fuel cell system according to the fifth embodiment will be described.

Figure 15:
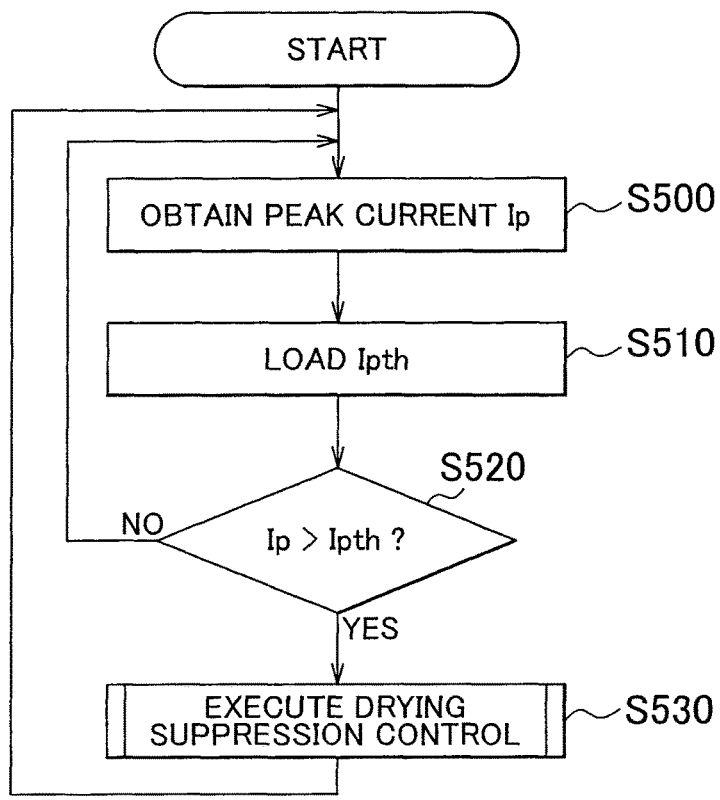
FIG. 15 is a flowchart that shows the flow of power generation concentration suppressing control process executed in a fuel cell system according to a fifth embodiment.

FIG. 15 is a flowchart that shows the flow of power generation concentration suppressing control process executed in the fuel cell system according to the fifth embodiment. This process is executed by the CPU of the control unit 70 in parallel with normal operation control in response to an output power required of the fuel cell stack 10.

When the power generation concentration suppressing control process is started, the CPU initially loads the operating condition of the fuel cell stack 10, and obtains a peak current Ip within the plane of the membrane electrode assembly 12 (step S500). The peak current Ip within the plane of the membrane electrode assembly 12 may be, for example, estimated using a function or map having various parameters in the operating condition of the fuel cell stack 10 as variables.

Subsequently, the CPU loads a threshold Ipth for the peak current Ip from the ROM (step S510), and then determines whether the peak current Ip obtained in step S500 is larger than the threshold Ipth (step S520). When the peak current Ip is smaller than or equal to the threshold Ipth (NO in step S520), the CPU recognizes that there is no local power generation concentration due to a locally insufficient water content within the plane of the electrolyte membrane within the plane of the membrane electrode assembly 12, and returns the process to step S500. On the other hand, when the peak current Ip is larger than the threshold Ipth (YES in step S520), the CPU recognizes that there is the power generation concentration within the plane of the membrane electrode assembly 12, and executes drying suppression control (step S530). In the fifth embodiment, in the drying suppression control, in consideration of the correlation between the back pressure of cathode offgas and the peak current Ip (see FIG. 16), the opening degree of the pressure regulating valve 36 is decreased to increase the back pressure of cathode gas for a predetermined period of time so that the peak current Ip is smaller than or equal to the threshold Ipth. By so doing, evaporation of water from the electrolyte membrane of the membrane electrode assembly 12 is suppressed to thereby make it possible to eliminate local power generation concentration due to a locally insufficient water content in the electrolyte membrane. In addition, in the drying suppression control, the rotational speed of the air compressor 31 may be decreased to reduce the flow rate of air supplied to the fuel cell stack 10 or the rotational speed of the hydrogen circulation pump 27 may be increased to increase the flow rate of hydrogen supplied to the fuel cell stack 10. Note that, after step S530, the CPU returns the process to step S500.

Figure 16:
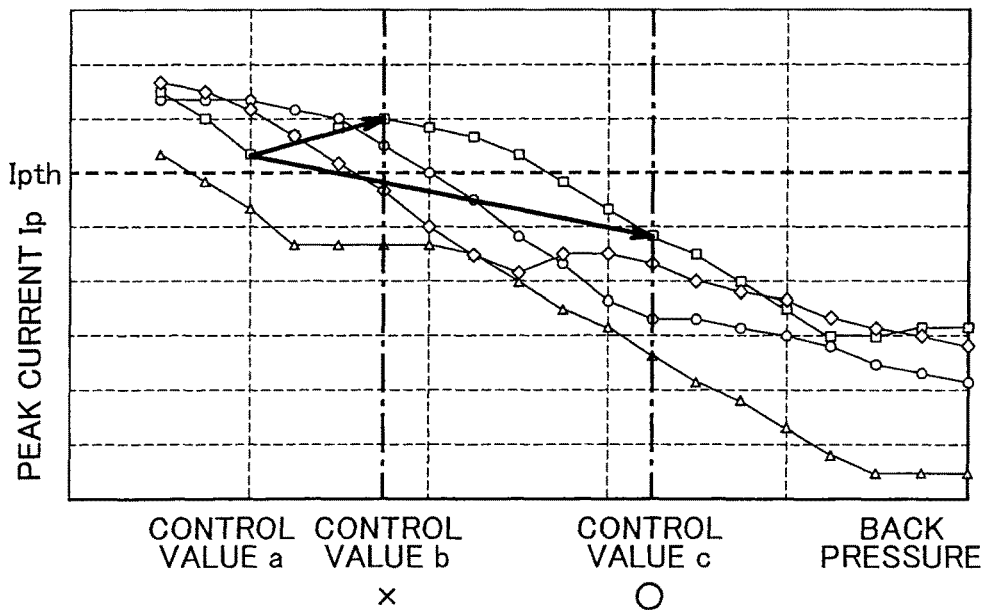
FIG. 16 is a graph that shows the correlation between the back pressure of cathode offgas and a peak current under various operating conditions of a fuel cell stack according to the fifth embodiment.

FIG. 16 is a graph that shows the correlation between the back pressure of cathode offgas and a peak current Ip under various operating conditions of the fuel cell stack 10. For example, as indicated by "□" in the graph, depending on the operating condition of the fuel cell stack 10, even when the control value for the back pressure of cathode offgas is set to a control value b that is larger than a control value a while the control value is the control value a and the peak current Ip is larger than the threshold Ipth, the peak current Ip may possibly increase to facilitate the power generation concentration. Then, in such a case, by consulting the illustrated profile (map), the back pressure of cathode offgas is instantaneously varied to a control value c at which the peak current Ip is smaller than the threshold Ipth. By so doing, it is possible to efficiently and quickly eliminate the power generation concentration.

With the thus described fuel cell system according to the fifth embodiment as well, in the fuel cell stack 10 (polymer electrolyte fuel cell), it is possible to suppress local degradation of each membrane electrode assembly 12 caused by local power generation concentration within the plane of the membrane electrode assembly 12 due to a water distribution.

Next, a sixth embodiment will be described. The configuration of a fuel cell system according to the sixth embodiment is the same as the configuration of the fuel cell system according to the second embodiment. However, in the fuel cell system according to the sixth embodiment, power generation concentration suppressing control process is different from the power generation concentration suppressing control process in the second embodiment. Hereinafter, the power generation concentration suppressing control process executed in the fuel cell system according to the sixth embodiment will be described.

Figure 17:
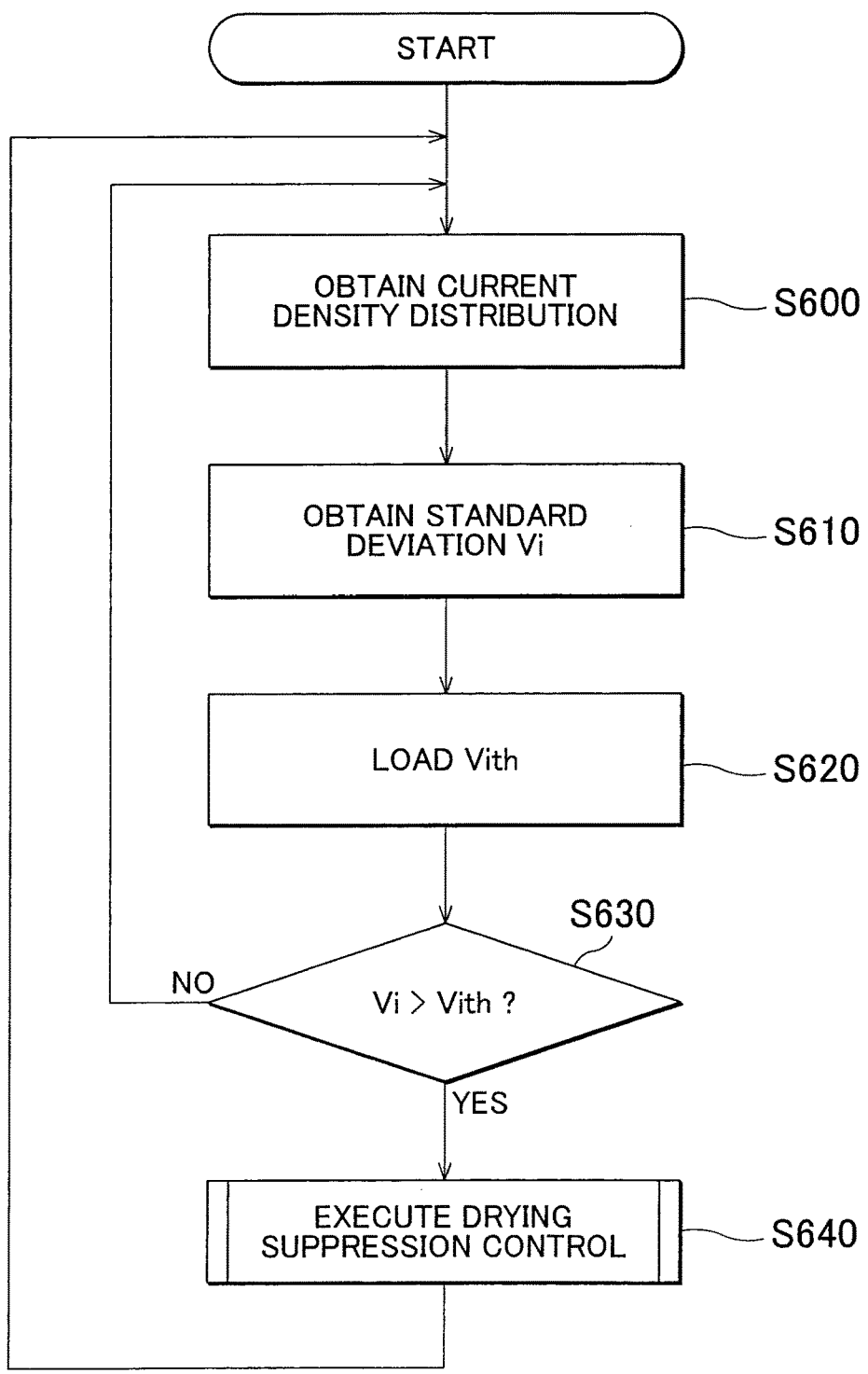
FIG. 17 is a flowchart that shows the flow of power generation concentration suppressing control process executed in a fuel cell system according to a sixth embodiment.

FIG. 17 is a flowchart that shows the flow of power generation concentration suppressing control process executed in the fuel cell system according to the sixth embodiment. This process is executed by the CPU of the control unit 70 in parallel with normal operation control in response to an output power required of the fuel cell stack 10.

When the power generation concentration suppressing control process is started, the CPU initially loads the operating condition of the fuel cell stack 10, and obtains a current density distribution within the plane of the membrane electrode assembly 12 (step S600). The current density distribution within the plane of the membrane electrode assembly 12 may be, for example, estimated using a function or map having various parameters in the operating condition of the fuel cell stack 10 as variables.

Subsequently, the CPU obtains a standard deviation Vi of the current density distribution obtained in step S600 (step S610). Then, the CPU loads a threshold Vith for the standard deviation Vi from the ROM (step S620), and then determines whether the standard deviation Vi is larger than the threshold Vith (step S630). When the standard deviation Vi is smaller than or equal to the threshold Vith (NO in step S630), the CPU recognizes that there is no local power generation concentration due to a locally insufficient water content within the plane of the electrolyte membrane within the plane of the membrane electrode assembly 12, and returns the process to step S600. On the other hand, when the standard deviation Vi is larger than the threshold Vith (YES in step S630), the CPU recognizes that there is the power generation concentration within the plane of the membrane electrode assembly 12, and executes drying suppression control (step S640). In the sixth embodiment, in the drying suppression control, in consideration of the correlation between the back pressure of cathode offgas and the standard deviation Vi (see FIG. 18), the opening degree of the pressure regulating valve 36 is decreased to increase the back pressure of cathode offgas for a predetermined period of time. By so doing, evaporation of water from the electrolyte membrane of the membrane electrode assembly 12 is suppressed to thereby make it possible to eliminate local power generation concentration due to a locally insufficient water content in the electrolyte membrane. In addition, in the drying suppression control, the rotational speed of the air compressor 31 may be decreased to reduce the flow rate of air supplied to the fuel cell stack 10 or the rotational speed of the hydrogen circulation pump 27 may be increased to increase the flow rate of hydrogen supplied to the fuel cell stack 10. Note that, after step S630, the CPU returns the process to step S600.

FIG. 18 is a graph that illustrates the correlation between the back pressure of anode offgas and the standard deviation Vi of a current density distribution under various operating conditions of the fuel cell stack 10. For example, under the operating condition of the fuel cell stack 10 indicated by "A" in the graph, when the control value of the back pressure of cathode offgas is a control value d and the standard deviation Vi of a current density distribution is larger than the threshold Vith, the back pressure of cathode offgas is instantaneously varied by consulting the illustrated profile (map) to a control value e at which the standard deviation Vi of a current density distribution is smaller than the threshold Vith. By so doing, it is possible to effectively and quickly eliminate the power generation concentration.

With the thus described fuel cell system according to the sixth embodiment as well, in the fuel cell stack 10 (polymer electrolyte fuel cell), it is possible to suppress local degradation of each membrane electrode assembly 12 caused by local power generation concentration within the plane of the membrane electrode assembly 12 due to a water distribution.

The several embodiments of the invention are described above; however, the aspect of the invention is not limited to those embodiments. The aspect of the invention may be implemented in various forms without departing from the scope of the invention. For example, the following alternative embodiments are applicable.

A first alternative embodiment will be described. In the first embodiment, the temperature sensors 14a and 14b are respectively provided for the frame member 14 at a portion adjacent to a portion from which air is introduced into the cathode of the membrane electrode assembly 12 at the outlet side of coolant and at a portion adjacent to a portion from which cathode offgas is exhausted from the cathode of the membrane electrode assembly 12 at the outlet side of coolant; however, the aspect of the invention is not limited to this configuration. The temperature sensors 14a and 14b just need to be provided at portions at which the correlation between the temperatures T1 and T2 and local power generation concentration of the membrane electrode assembly 12 is known in advance.

A second alternative embodiment will be described. In the first embodiment, determination as to the power generation concentration is made on the basis of the difference between the temperature T2 and the temperature T1; however, the aspect of the invention is not limited to this configuration. For example, determination as to the power generation concentration may be determined on the basis of the ratio between the temperature T2 and the temperature T1.

A third alternative embodiment will be described. In the power generation concentration suppressing control process according to the first embodiment, fuel gas flow passage water drain control, oxidant gas flow passage water drain control and drying suppression control are separately executed; however, the aspect of the invention is not limited to this configuration. For example, when an excessive amount of residual water in the fuel gas flow passage and an excessive amount of residual water in the oxidant gas flow passage have been detected from the determination result in step S110 of FIG. 5, fuel gas flow passage water drain control and oxidant gas flow passage water drain control may be executed in parallel with each other.

A fourth alternative embodiment will be described. The processes of step S100 to step S130 in the power generation concentration suppressing control process according to the first embodiment may applied to the power generation concentration suppressing control processes according to the second to sixth embodiments.

A fifth alternative embodiment will be described. In the power generation concentration suppressing control process according to the first embodiment, the processes of step S100 to step S130 may be omitted.

A sixth alternative embodiment will be described. In the first to third embodiments, in the drying suppression control of the power generation concentration suppressing control process, the back pressure of cathode offgas is linearly varied in response to the degree of local power generation concentration within the plane of the membrane electrode assembly 12; however, the aspect of the invention is not limited to this configuration. For example, the back pressure of cathode offgas may be varied in a stepwise manner in response to the degree of the power generation concentration.

A seventh alternative embodiment will be described. In the first to third embodiments, in the power generation concentration suppressing control process, drying suppression control is executed for a predetermined period of time; however, the aspect of the invention is not limited to this configuration. A period of time (duration), during which drying suppression control is executed while the amount of increase in the back pressure of cathode offgas is kept constant, may be varied in response to the degree of local power generation concentration within the plane of the membrane electrode assembly 12. For example, the duration of drying suppression control may be extended as the degree of local power generation concentration within the plane of the membrane electrode assembly 12 increases.

An eighth alternative embodiment will be described. In the power generation concentration suppressing control processes according to the fifth and sixth embodiments, when the power generation concentration is not eliminated after drying suppression control, fuel gas flow passage water drain control or oxidant gas flow passage water drain control described in the first embodiment may be further executed.

A ninth alternative embodiment will be described. In the power generation concentration suppressing control processes according to the first to sixth embodiments, the output power of the fuel cell stack 10 may be considered in order to determine whether there is local power generation concentration within the plane of the membrane electrode assembly 12. This is because, when there is the power generation concentration within the plane of the membrane electrode assembly 12, the effective power generation area reduces and, therefore, the output power of the fuel cell stack 10 mostly decreases below a desired output power.

In addition, in the power generation concentration suppressing control processes according to the first to sixth embodiments, the impedance of the fuel cell stack 10 may be considered in order to determine whether there is local power generation concentration within the plane of the membrane electrode assembly 12. This is because, when there is the power generation concentration within the plane of the membrane electrode assembly 12, the impedance of the fuel cell stack 10 increases above a desired value or steeply varies in a short period of time.

What is claimed is:

1. A fuel cell system comprising:
   a fuel cell having a membrane electrode assembly, the membrane electrode assembly having an anode and a cathode which are respectively bonded to both surfaces of an electrolyte membrane formed of a solid polymer;
   a fuel gas flow passage flowing fuel gas along a surface of the anode;
   an oxidant gas flow passage flowing oxidant gas along a surface of the cathode;
   a fuel gas supply/exhaust unit configured to supply fuel gas to the anode and configured to exhaust anode off-gas exhausted from the anode, via the fuel gas flow passage;
   an oxidant gas supply/exhaust unit configured to supply oxidant gas to the cathode and configured to exhaust cathode off-gas exhausted from the cathode, via the oxidant gas flow passage;
   a frame member provided at an outer peripheral portion of the membrane electrode assembly;
   a first temperature sensor provided at a first portion of the frame member, the first temperature sensor being configured to detect a temperature of the first portion;
   a second temperature sensor provided at a second portion of the frame member, the second portion being higher in temperature than the first portion, and the second temperature sensor being configured to detect a temperature of the second portion;
   a power generation concentration determining unit programmed to determine whether there is a phenomenon in the fuel cell resulting from local power generation concentration, where the amount of power generation per unit area locally exceeds an allowable value, within a plane of the membrane electrode assembly due to a water distribution, the water distribution including a water content distribution within a plane of the electrolyte membrane, a residual water distribution in the fuel gas flow passage and a residual water distribution in the oxidant gas flow passage, and the power generation concentration determining unit being programmed to determine whether a difference between the temperature of the second portion and the temperature of the first portion is larger than a predetermined threshold; and
   a control unit being programmed to determine whether there is insufficient water content of the electrolyte membrane and to increase a control value that is a back pressure of cathode off gas when:
      (i) it is determined that the difference between the temperature of the second portion and the temperature of the first portion is larger than the predetermined threshold; and
      (ii) it is determined that there is insufficient water content of the electrolyte membrane.

2. The fuel cell system according to claim 1, wherein the first portion is a portion located adjacent to a portion from which the oxidant gas is introduced into the cathode, and the second portion is a portion located adjacent to a portion from which the cathode off-gas is exhausted from the cathode.

3. The fuel cell system according to claim 1, wherein the first temperature sensor and the second temperature sensor are provided on the same frame member.

4. The fuel cell system according to claim 1, wherein as the difference between the predetermined threshold and the difference between the temperature of the second portion and the temperature of the first portion increases with respect to the threshold, the control unit is configured to increase the back pressure of cathode off gas.

5. The fuel cell system according to claim 1, wherein (i) the fuel cell system includes a cathode off gas passage and a pressure regulating valve provided on the cathode off gas passage, and (ii) the control unit is programmed to decrease an opening degree of the pressure regulating valve to increase the back pressure of cathode off gas.

6. The fuel cell system according to claim 1, wherein the temperature comparison to the predetermined threshold occurs subsequent to the determination that there is insufficient water content of the electrolyte membrane.

7. A control method for a fuel cell system that includes: a fuel cell that has a membrane electrode assembly in which an anode and a cathode are respectively bonded to both surfaces of an electrolyte membrane formed of a solid polymer, a fuel gas flow passage flowing fuel gas along a surface of the anode, and an oxidant gas flow passage flowing oxidant gas along a surface of the cathode; a fuel gas supply/exhaust unit configured to supply fuel gas to the anode and configured to exhaust anode off-gas exhausted from the anode, via the fuel gas flow passage; and an oxidant gas supply/exhaust unit configured to supply oxidant gas to the cathode and configured to exhaust cathode off-gas exhausted from the cathode, via the oxidant gas flow passage; a frame member provided at an outer peripheral portion of the membrane electrode assembly; a first temperature sensor provided at a first portion of the frame member and configured to detect a temperature of the first portion; and a second temperature sensor provided at a second portion of the frame member, the second portion being higher in temperature than the first portion, and the second temperature sensor configured to detect a temperature of the second portion, the control method comprising:
   determining whether there is phenomenon in the fuel cell resulting from local power generation concentration, where the amount of power generation per unit area locally exceeds an allowable value, within a plane of the membrane electrode assembly due to a water distribution, the water distribution including a water content distribution within a plane of the electrolyte membrane, a residual water distribution in the fuel gas flow passage and residual water distribution in the oxidant gas flow passage;

determining whether there is insufficient water content of the electrolyte membrane; and when it is determined that there is the phenomenon, controlling at least one of the fuel gas supply/exhaust unit and the oxidant gas supply/exhaust unit so as to eliminate the phenomenon;

determining whether a difference between the temperature of the second portion and the temperature of the first portion is larger than a predetermined threshold, and when the difference between the temperature of the second portion and the temperature of the first portion is larger than the predetermined threshold and it is determined that there is insufficient water content of the electrolyte membrane, controlling at least one of the fuel gas supply/exhaust unit and the oxidant gas supply/exhaust unit so that the difference between the temperature of the second portion and the temperature of the first portion becomes smaller than or equal to the predetermined threshold.

* * * * *